US012730706B2

(12) United States Patent
White et al.

(10) Patent No.: US 12,730,706 B2
(45) Date of Patent: Sep. 8, 2026

(54) DISTRIBUTED SYSTEM MANAGEMENT VALIDATION

(71) Applicant: Dell Products L.P., Round Rock, TX (US)

(72) Inventors: William Jeffery White, Plano, TX (US); Maxim Balin, Gan-Yavne (IL); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/891,061

(22) Filed: Sep. 20, 2024

(65) Prior Publication Data

US 2026/0086894 A1 Mar. 26, 2026

(51) Int. Cl.

*G06F 11/00* (2006.01)
*G06F 11/07* (2006.01)
*G06F 11/34* (2006.01)

(52) U.S. Cl.

CPC ...... *G06F 11/0793* (2013.01); *G06F 11/3414* (2013.01)

(58) Field of Classification Search

CPC ......................... G06F 11/0793; G06F 11/3414
See application file for complete search history.

(56) References Cited

U.S. PATENT DOCUMENTS 10,152,381 B1 12/2018 Shvaiger
2006/0080014 A1* 4/2006 Di Palma ............ G06F 11/3452 701/41
2019/0108045 A1* 4/2019 Lee ..................... G06F 11/3636
2020/0175409 A1* 6/2020 Kandala ................. G06N 10/40
2022/0292303 A1* 9/2022 Cao ......................... G06F 9/505

OTHER PUBLICATIONS

Ragazzini et al., (2021). "A Digital Twin-based Predictive Strategy for Workload Control", Elsevier, IFAC—PapersOnLine, vol. 54, Issue 1, 2021, retrieved from <https://www.sciencedirect.com/science/article/pii/S2405896321009538> on Sep. 19, 2024, pp. 743-748 (6 pages).

Li et al., (2022). "Digital Twin-Driven Computing Resource Management for Vehicular Networks", arXiv:2211.13818v1, Nov. 24, 2022, retrieved from <https://arxiv.org/pdf/2211.13818> on Sep. 19, 2024 (6 pages).

Zhang et al., (2023). "Adaptive Digital Twin Server Deployment for Dynamic Edge Networks in IoT System", 2023 IEEE/CIC International Conference on Communications in China (ICCC), Sep. 5, 2023 from < https://ieeexplore.ieee.org/document/10233465> on Sep. 19, 2024, pp. 1-6 (6 pages).

(Continued)

*Primary Examiner* — Joshua P Lottich
(74) *Attorney, Agent, or Firm* — WOMBLE BOND DICKINSON (US) LLP

(57) ABSTRACT

Methods and systems for providing computer implemented services are disclosed. To provide the services, control variables may be obtained. The control variables may be used to manage operation of a system. Prior to use, trust in the control variables may be established. The requirements for establishing trust may be dynamic, and may change based on conditions impacting the system. Information regarding whether trust is established in control variables may be used in future selections of control variables.

20 Claims, 17 Drawing Sheets

(56) References Cited

OTHER PUBLICATIONS

Zhou et al., (2022). "Digital Twin-Empowered Network Planning for Multi-Tier Computing", arXiv:2210.02616v2, Dec. 6, 2022, retrieved from <https://arxiv.org/abs/2210.02616> on Sep. 19, 2024, pp. 1-37 (37 pages).
Huang et al., (2023). "Digital Twin Based User-Centric Resource Management for Multicast Short Video Streaming", arXiv:2308.08995v1, Aug. 17, 2023, retrieved from <https://arxiv.org/abs/2308.08995> on Sep. 19, 2024, pp. 1-13 (13 pages).
Huang et al., (2024). "When Digital Twin Meets Generative AI: Intelligent Closed-Loop Network Management", arXiv:2404.03025v2, Apr. 8, 2024, retrieved from <https://arxiv.org/abs/2404.03025v2> on Sep. 19, 2024, pp. 1-8 (8 pages).
Gomes et al., (2021). "Digital Twin of a Cloud Data Centre: OpenStack Cluster Visualisation", arXiv:2108.06123, Aug. 13, 2021, retrieved from <https://arxiv.org/abs/2108.06123> on Sep. 19, 2024, pp. 1-15 (15 pages).
Yao et al., (2023). "Systematic review of digital twin technology and applications", Visual Computing for Industry, Biomedicine, and Art, May 30, 2023, doi: 10.1186/s42492-023-00137-4, retrieved from <https://www.ncbi.nlm.nih.gov/pmc/articles/PMC10229487/> on Sep. 19, 2024, pp. 1-20 (20 pages).
Du et al., (2023). "Digital Twin Graph: Automated Domain-Agnostic Construction, Fusion, and Simulation of IoT-Enabled World", arXiv:2304.10018v1, Apr. 20, 2023, retrieved from <https://arxiv.org/abs/2304.10018> on Sep. 19, 2024, pp. 1-4 (4 pages).
Ying-Cheng Lai, (2023). "Digital twins of nonlinear dynamical systems: A perspective", arXiv:2309.11461v1, Sep. 20, 2023, retrieved from <https://arxiv.org/abs/2309.11461> on Sep. 19, 2024, pp. 1-12 (12 pages).
Wu et al., (2022). "Differentiable Fuzzy ALC: A Neural-Symbolic Representation Language for Symbol Grounding", arXiv:2211.12006v2, Dec. 1, 2022, retrieved from <https://arxiv.org/abs/2211.12006> on Sep. 19, 2024, pp. 1-13 (13 pages).
Jacobson et al., (2023). "Integrating Symbolic Reasoning into Neural Generative Models for Design Generation", arXiv:2310.09383v1, Oct. 13, 2023, retrieved from <https://arxiv.org/pdf/2310.09383> on Sep. 19, 2024, pp. 1-32 (32 pages).
Emile van Krieken, (2024). "Optimisation in Neurosymbolic Learning Systems", Department of Computer Science Faculty of Sciences, Vrije Universiteit Amsterdam, DOI: http://doi.org/10.5463/thesis.466, Jan. 19, 2024, retrieved from <https://arxiv.org/pdf/2401.10819> on Sep. 19, 2024 (200 pages).
Fadi Al Machot, (2023). "Bridging Logic and Learning: a Neural-Symbolic Approach for Enhanced Reasoning in Neural Models (Asper)", arXiv:2312.11651v1, Dec. 18, 2023, retrieved from <https://arxiv.org/pdf/2312.11651> on Sep. 19, 2024, pp. 1-11 (11 pages).
Zhang et al., (2021). "Neural, Symbolic and Neural-Symbolic Reasoning on Knowledge Graphs", arXiv:2010.05446v5, Mar. 31, 2021, retrieved from <https://arxiv.org/pdf/2010.05446>on Sep. 19, 2024, pp. 1-29 (29 pages).
Alevizos et al., (2024). "Towards an AI-Enhanced Cyber Threat Intelligence Processing Pipeline", arXiv:2403.03265, Mar. 5, 2024, retrieved from <https://arxiv.org/pdf/2403.03265> on Sep. 19, 2024, pp. 1-14 (14 pages).
Saxena et al., (2023). "An AI-Driven VM Threat Prediction Model for Multi-Risks Analysis-Based Cloud Cybersecurity", arXiv:2308.09578v1, Aug. 18, 2023, retrieved from <https://arxiv.org/pdf/2308.09578> on Sep. 19, 2024, pp. 1-13 (13 pages).
Siva Raja Sindiramutty, (2023). "Autonomous Threat Hunting: A Future Paradigm for AI-Driven Threat Intelligence", arXiv:2401.00286v1, Dec. 30, 2023, retrieved from <https://arxiv.org/pdf/2401.00286> on Sep. 19, 2024, pp. 1-79 (79 pages).
Zhu et al., (2024). "Nip in the Bud: Forecasting and Interpreting Post-exploitation Attacks in Real-time through Cyber Threat Intelligence Reports", IEEE Transactions on Dependable and Secure Computing, arXiv:2405.02826v1, May 5, 2024, retrieved from <https://arxiv.org/pdf/2405.02826> on Sep. 19, 2024, pp. 1-19 (19 pages).
Friji et al., (2024). "Multi-stage Attack Detection and Prediction Using Graph Neural Networks: An IoT Feasibility Study", arXiv:2404.18328, Apr. 28, 2024, retrieved from <https://arxiv.org/pdf/2404.18328> on Sep. 19, 2024, pp. 1-8 (8 pages).

* cited by examiner

DISTRIBUTED SYSTEM MANAGEMENT VALIDATION

FIELD

Embodiments disclosed herein relate generally to management. More particularly, embodiments disclosed herein relate to management of operation of distributed systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2D-2E and 4A show diagrams illustrating examples of graph data structures in accordance with an embodiment.

DETAILED DESCRIPTION

Figure 1A:
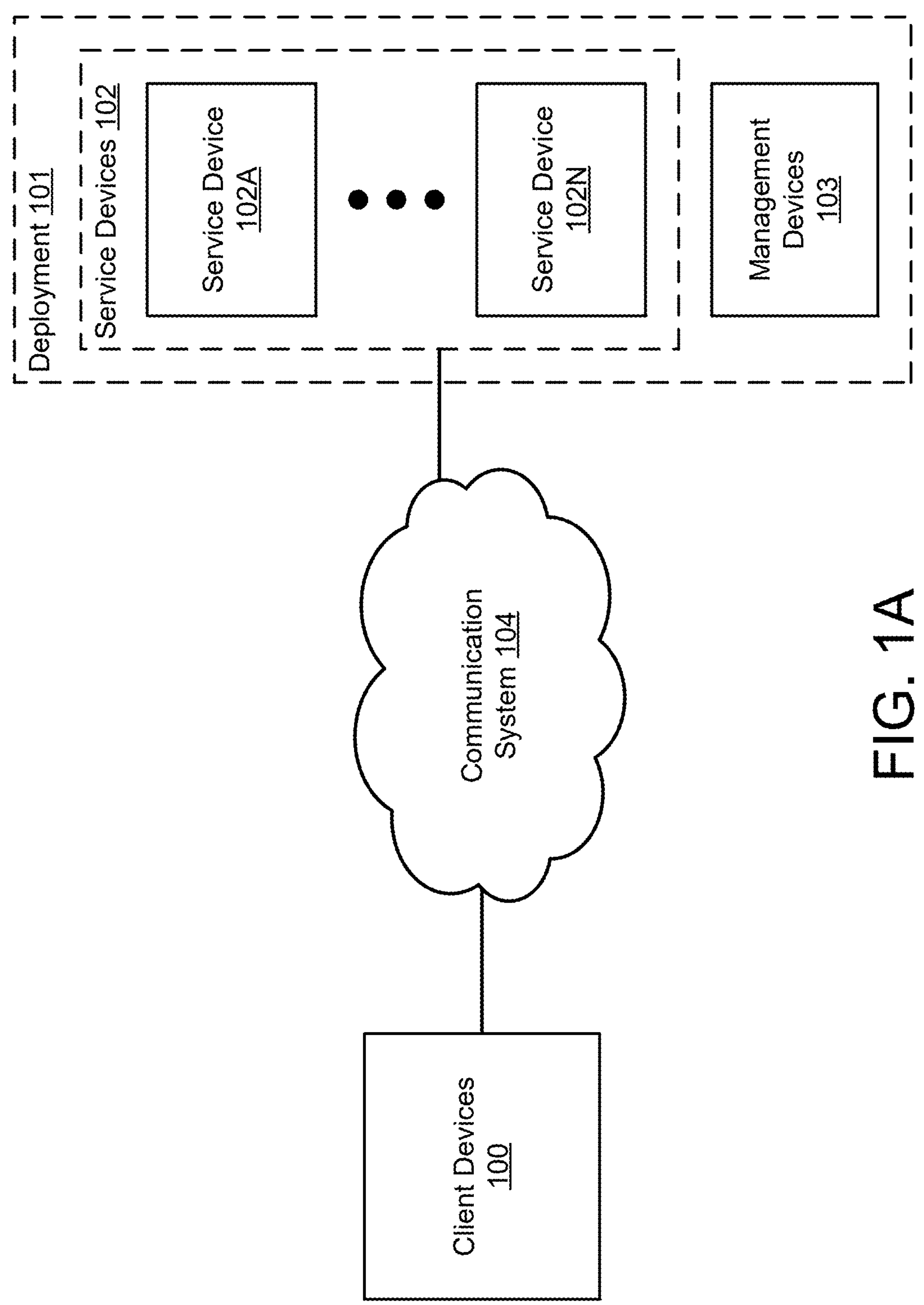
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer-implemented services. To provide the computer implemented services, operation of a distributed system may be managed.

To manage the operation of the distributed system, a Dynamic Twin Predictive Control (DTPC) system may be used. The DTPC may include global and local control planes. The global control plane may generate a faithful simulation of the global platform and its interaction with external entities and local edge zones managed by local control planes. The DTPC system may be based on data driven model predictive control. The DTPC may obtain, as input, control variable calculations across a control window time period from an Objective Optimization Reasoning Engine (OORE) and simulate the performance of the platform across the prediction window. For the k+1 period, the simulation of DTPC may be compared to platform output variables collected through telemetry and an error signal (e.g., an error analysis) is created. The simulation across the prediction window and error signal may be used to drive prediction processes for future operation of the distributed system. Global optimization of the complete platform may be controlled by the DTPC-Global control plane. The system may manage the large number of control variables and output system management and output-controlled scopes.

The control process may organized into platform, security and data control. By doing so, a system in accordance with an embodiment may provide a higher throughput rate for computer implemented services, less down time, and ma provide other advantages for computer implemented services. Thus, embodiments disclosed herein may address, among others, the technical problem of complex system management. The disclosed embodiments may address at least this technical problem by providing a system control architecture that is able to manage the large number of control variables that may not be computationally tractable via other methods. Accordingly, a system in accordance with an embodiment may provide improved computer implemented services through improved system management.

In an embodiment, a method for managing operation of a distributed system is provided. The method may include obtaining, by a device of the distributed system and from a control system of the distributed system, purported control variables for use by the device during a control window; evaluating, by the device, trust in the purported control variables using validation data that is based on conditions impacting the distributed system; in a first instance of the evaluating where at least a portion of the purported control variables are found to be trustworthy: updating operation of the device using the at least the portion of the purported control variables to obtain an updated device, and providing computer implemented services using the updated device during the control window; and in a second instance of the evaluating where the purported control variables are found to be untrustworthy: rejecting, by the device, use of the purported control variables.

The method may also include, in the first instance of the evaluating: identifying a second portion of the purported control variables that are found to be untrustworthy; and performing, based on the second portion, a remediation procedure to facilitate continued operation of the device.

Performing the remediation procedure may include synthesizing replacement control variables for the second portion of the control variables.

The purported control variables may be based, at least in part, on feedback on trustworthiness of previous purported control variables for another control window.

The method may also include, in the first instance of the evaluating: generating new feedback based on the first portion, the second portion, and conditions; and initiating use of the new feedback in subsequently performed control variable selection processes.

The feedback may indicate, at least, that the second portion were deemed to be untrustworthy, and a basis for the untrustworthy designation.

The validation data may include validation criteria and thresholds for the control variables that are usable to discriminate trustworthy control variables from untrustworthy control variables.

The validation criteria and thresholds may be dynamic, and changed based on the conditions impacting the distributed system.

The conditions may include at least one selected from a list consisting of: available computing resources for use during the next control window; estimated workload during the next control window; a security posture of at least the device; and a network security risk level of a network to which the distributed system is exposed.

The validation criteria may be based, at least in part, on cryptographic validation methods usable to validate authenticity and integrity of the purported control variables.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide computer-implemented services. The computer-implemented services may include data management services, data storage services, data access and control services, database services, and/or any other types of services that may be provided with a computing device.

To provide the services, various workloads may be performed by components of the system. Performance of the workload may result in completion of desired computer implemented services. However, if the workloads are not performed in a desirable manner, then the system may fail to provide desired computer implemented services.

For example, if components of the system are left vulnerable and exploited by malicious actors, the workloads performed by the components may be compromised. The resulting compromised workloads may result in undesirable downstream impacts (e.g., loss of sensitive information, lack of access to desired information, etc.).

Similarly, lack of access to data used in the performance of the workloads and lack of sufficient resources to perform the workloads may result in the services failing to be performed timely. If a workload is assigned to a component for performance, the component may fail to perform the workload timely if the components has other workloads to perform. Lack of access to data necessary to perform workloads may also delay performance leading to the resulting services not being provided in a timely manner (e.g., meeting client timeliness expectations).

In general, embodiments disclosed herein may provide methods, systems, and/or devices for improving the likelihood of desired computer implemented services to be provided. To improve the likelihood of the desired computer implemented services being provided, a system in accordance with an embodiment may utilize a control system to manage its operation. The control system may be distributed (e.g., different levels of control such as global, local, zone, etc.), may be predictive (e.g., may evaluate future operation of the system under different scenarios), and may orchestrate operation of the system.

By utilizing such a control system, embodiments disclosed herein may provide a distributed system that is more likely to be able to provide desired computer implemented services through proactive management of operation of the system over time. Thus, embodiments disclosed herein may address, among others, the technical problem of distributed system management. Such distributed systems may include such large numbers of potential states, options (e.g., control variables that define aspects of operation of the system), and/or other configurable settings that global evaluation to find a best possible set of control variables may not be possible. The disclosed embodiments may provide a system that addresses this challenge through problem space reduction leading to a computationally tractable process for identifying a best possible set of control variables.

To provide the above noted function, the system may include client devices 100, deployment 101, and communication system 104. Each of these components is discussed below.

Client devices 100 may utilize computer implemented services provided by deployment 101. The services may be any number and type of computer implemented services. For example, client devices 100 may request that deployment 101 perform certain functions, actions, etc. As will be discussed below, deployment 101 may utilize the control system to orchestrate its operation in a manner that is more likely to result in the computer implemented services provided to client devices 100 being desirable.

Deployment 101, as noted above, may provide any number and type of computer implemented services to client devices 100. To do so, deployment 101 may include service devices 102 and management devices 103.

Service devices 102 may generally provide the computer implemented services. For example, service devices 102 may perform various workloads as required by client devices 100 and/or other entities.

Figure 1B:
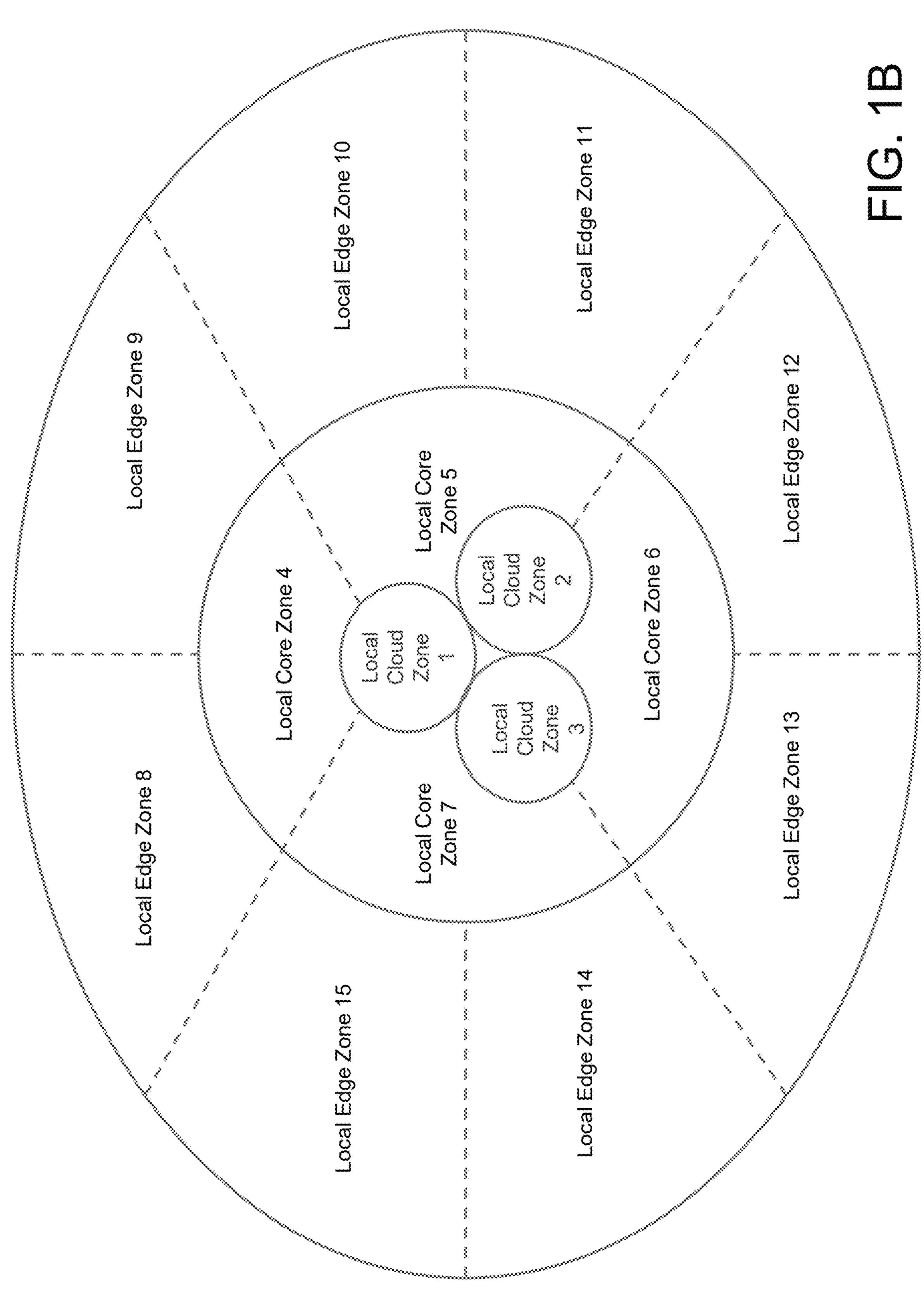
FIGS. 1B-1D show block diagrams illustrating aspects of management of distributed systems in accordance with an embodiment.
Figure 1C:
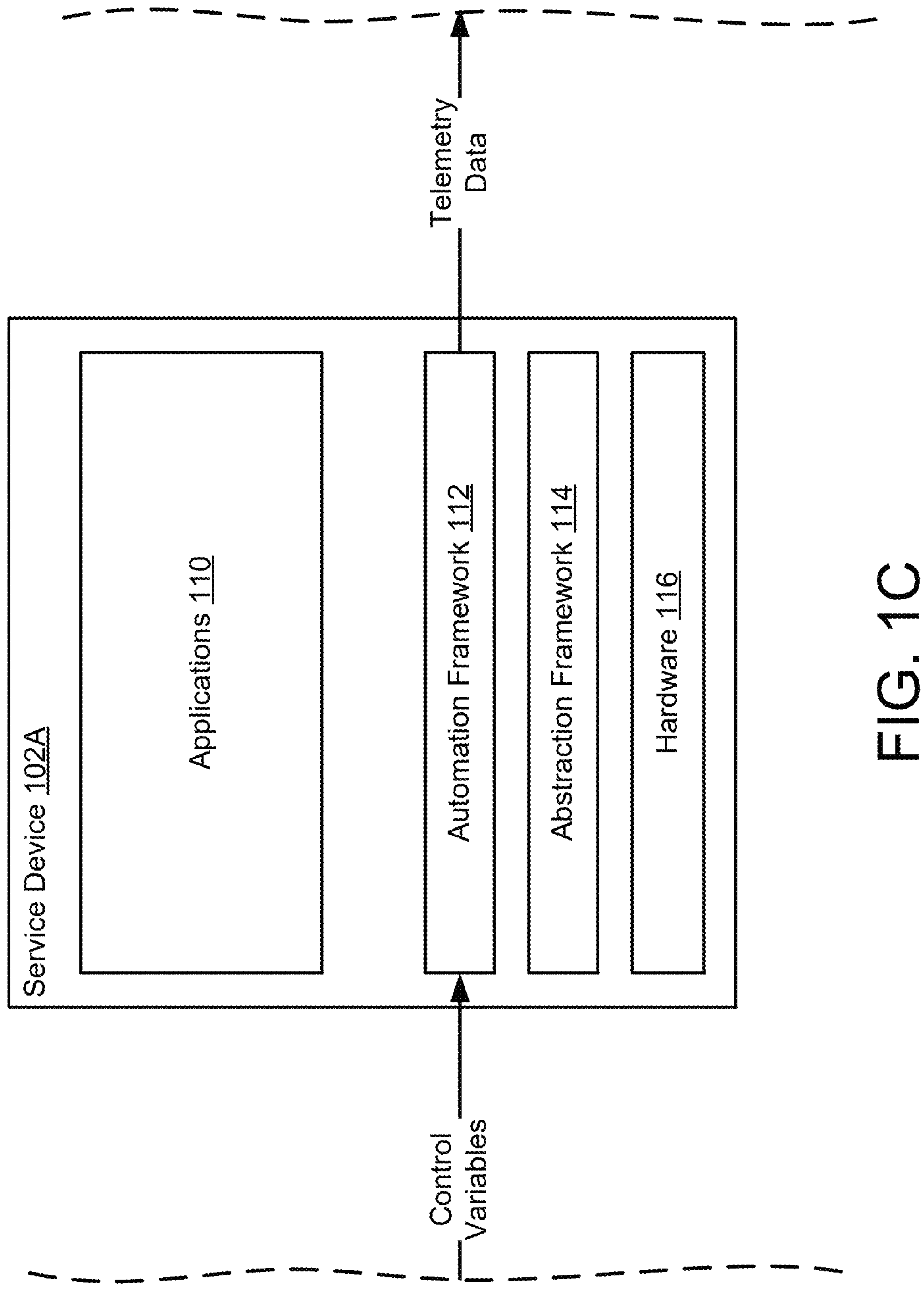
Figure 1D:
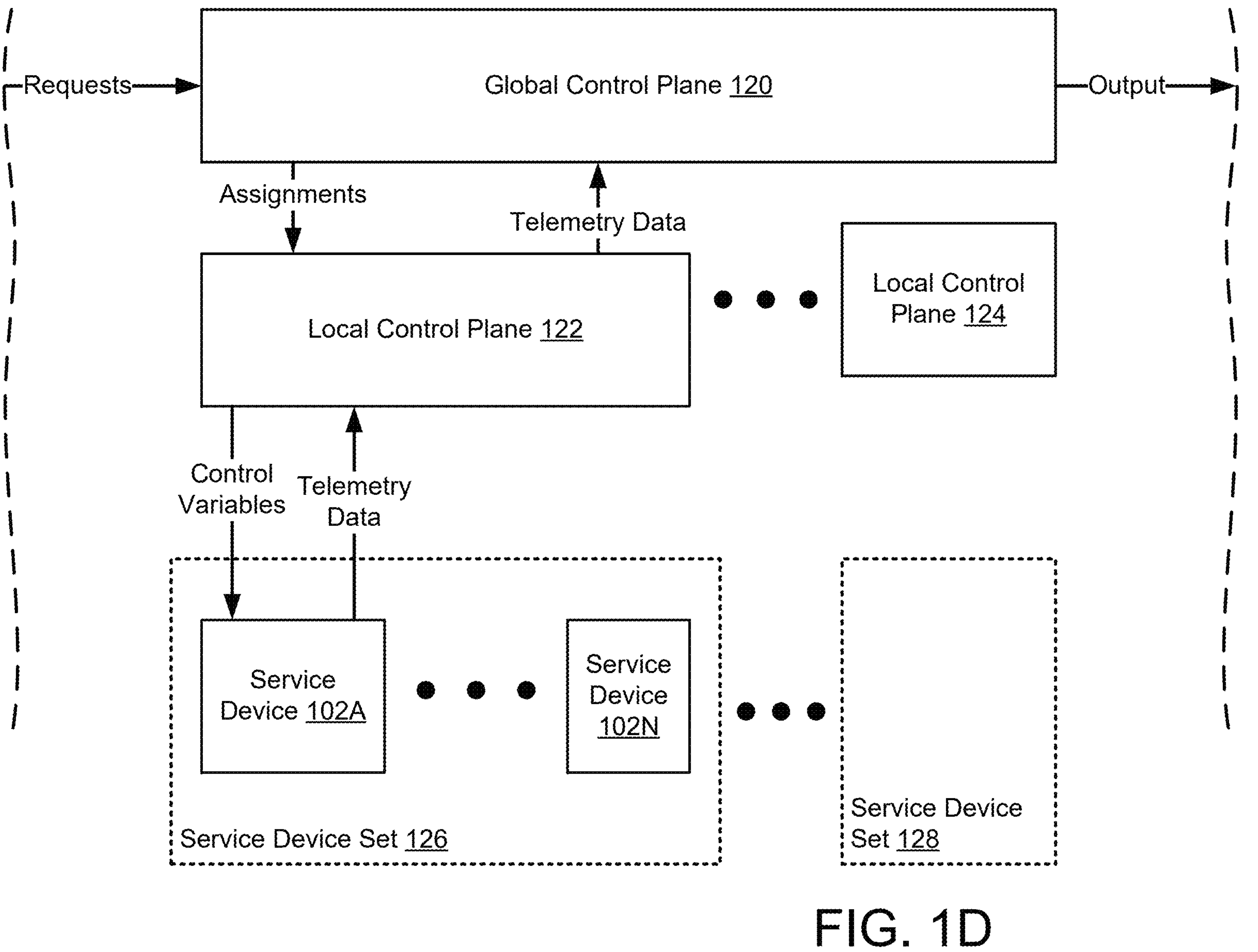

Management devices 103 may manage operation of service devices 102. To do so, management devices 103 may host the control system, as discussed above. Refer to FIGS. 1B-1D for additional information regarding implementation and operation of the control system.

While illustrated as being separate, it will be appreciated that the functionality of any of service devices 102 and management devices 103 may be performed by a single device. For example, a single device may host different software that enables the device to provide the functionality of a service device and a management device.

When providing their functionality, any (and/or portions thereof) of client devices 100 and deployment 101 may perform all, or a portion, of the actions, flows, and methods shown in FIGS. 2A-3E.

Any of (and/or components thereof) client devices 100 and deployment 101 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1A as including a limited number of specific components, a system in accordance with an embodiment may include fewer, additional, and/or different components than those illustrated therein.

To further clarify embodiments disclosed herein, illustrative diagrams showing aspects of a system in accordance with an embodiment are shown in FIGS. 1B-1D. Specifically, in FIGS. 1B-1D, control, responsibility, and management distribution schemes are illustrated. The aforementioned schemes may be employed by the system of FIG. 1A to manage its operation.

Turning to FIG. 1B, a first diagram illustrating logical division of the components of FIG. 1A in accordance with an embodiment is shown. In FIG. 1B, various zones are demarcated using solid and dashed lines. Each of the demarcated zone represents a group of data processing systems of the system of FIG. 1A. The grouping may be based, for example, on geographic location, network location, function, and/or other characteristics of the data processing systems belonging to each zone.

For example, local edge zones (e.g., 8-15) may include edge device deployments. The data processing systems in each of these zones may perform edge function (e.g., last mile services to reduce latency to client devices). Likewise, local core zones (e.g., 4-7) may represent core data centers (e.g., on-prem or managed infrastructures) that provide some different functions from the local edge zones. Similarly, local cloud zones (e.g., 1-3) may represent cloud based computing resources that provide further differentiated functionality.

Each of the local zones may be managed using a local control system, while the aggregate functionality may be managed using a global control system. Additionally, each local zone may be further disaggregated into logical regions (not shown). The aforementioned architecture may result in discrete groups of data processing systems that operate independently of the other groups (e.g., but for inter-group coordination). To manage the operation of these groups, the aforementioned local, global, and potentially zone level control systems may be utilized. Refer to FIGS. 1C-1D for additional details regarding the control system used to manage these groups of data processing systems.

Turning to FIG. 1C, a second diagram illustrating an example control orchestration used in the system of FIG. 1A in accordance with an embodiment is shown. To control the provisioning of computer implemented services, the distributed control system used to manage the system of FIG. 1A may select and distribute control variables to devices within the system. The control variables may include information regarding (i) goals to be met, (ii) changes in configuration of the devices, (iii) choreography instructions, and/or other information usable by the control system to manage the operation of the distributed system.

The control variables may be cooperatively established by global, local, and zone level control systems. Refer to FIG. 1D for additional information regarding establishment of values for control variables.

To utilize the control variables, a service device (e.g., 102A) may include various applications (e.g., 110), an automation framework (e.g., 112), abstraction frameworks (e.g., 114), and various hardware (e.g., 116). When received, automation framework 112 may process and utilize the control variables to guide operation of service device 102A.

For example, automation framework 112 may initiate performance of various tasks based on the control variables. The tasks may include, for example, (i) performance of workloads, (ii) migration/sharing/removal of data (e.g., between devices), (iii) initiation of choreographed interactions/operations, and/or perform other tasks. To do so, automation framework 112 may instruct various other hosted components (e.g., 110, 114) to perform the actions.

In addition to initiating operation, automation framework 112 may manage collection and providing of telemetry data to the control system. The telemetry data may include any type and quantity of information regarding operation of service device 102A. The collected information may be collected in accordance with, for example, a data collection plan, data collection schema, instructions from the control system, etc. Once collected, automation framework 112 may distribute the telemetry data to the control system (e.g., various devices making up the control system.

Abstraction framework 114 may include, for example, operating systems, drivers, and/or other components for managing and providing access to computing resources contributed by hardware 116.

Hardware 116 may include any number and types of hardware components (e.g., processors, memory devices, storage devices, network interface devices, etc.).

Applications 110 may utilize computing resources (e.g., processor cycles, memory space, storage space, etc.) to provide various computer implemented services. Applications 110 may include any number and type of applications that contribute to any number of computer implemented services (e.g., provided in isolation and/or cooperation with other devices).

Any of applications 110, automation framework 112, and abstraction framework 114 may be implemented with any combination of hardware and/or software components. For example, automation framework 112 may be implemented with software hosted by hardware 116 and/or may include a separate specialized hardware component such as a management controller or other type of out of band device.

Thus, the services devices of the system of FIG. 1A may be managed and orchestrated by the control system to provide desired computer implemented services.

Turning to FIG. 1D, a third diagram illustrating an example system of control used by the system of FIG. 1A in accordance with an embodiment is shown.

To manage the service devices and/or other components of deployment 101 shown in FIG. 1A, the system of FIG. 1A may implement a distributed control system that include a global control plane (e.g., 120) and any number of local control planes (e.g., 122). Local control planes (e.g., 122-124) may each manage a subset (e.g., 126) of the service devices (e.g., 102A-102N) of the deployment, and global control plane 120 may manage operation of the deployment.

For example, global control plane 120 may be responsible for, for example, workload distribution, platform control (e.g., configuration), continuous integration and continuous delivery of platform interfaces, manifest processing, software image management, content delivery network origination, application programming interface management, tenant dispatching, data management (e.g., naming, distribution, etc.), telemetry data evaluation (e.g., metric comparison to evaluate performance), clock synchronization, and/or other global functions.

In contrast, each local control plane (e.g., 122) may be responsible for inventory, workload performance scheduling, application and data placement, choreography, anomaly detection, impairment management (e.g., isolation), system state synchronization, network management and control, site to core network management (e.g., each local control plane may manage networks used by a corresponding service device set), security policy enforcement, identity management, compliance, behavior evaluation, secret vault (e.g., storage of keys, passwords, etc.), pipeline management, asset management, cache control, data consistency etc.

To facilitate management and communications, any of the components shown in FIG. 1D may be operably connected using general and/or out of band networks, and may host distributed software for, for example, cluster management, site networking, authentication, data management (e.g., identification, classification, publication, access controls, etc.), and/or other functionalities for management of distributed system.

To manage the operation of the deployment, global control plane 120 may, for example, obtain various requests from client devices (e.g., 100), host digital twins of any of the components of FIG. 1D, and utilize predictive algorithms with optimization to select how to, for example, assign work, modify configurations, and otherwise manage the operation of the other components of the system. Additionally, global control plane 120 may collect telemetry data from any of the local control planes and/or service devices. The telemetry data may, as will be discussed further below, be utilized to guide future operation of the deployment.

Likewise, each of the local control planes (e.g., 122) may obtain telemetry data from service devices and information from global control plane 120. The information from the global control plane may include, for example, goals, assignments, instructions, control variables, etc. Based on the collected information, the local control planes may obtain control variables and provide the control variables to the service devices (and/or management devices) to manage operation of the deployment.

Thus, using the control architecture illustrated in FIG. 1D, a distributed control plane may be established. Each of the control planes may be implemented using separate devices or software hosted by any number of devices that cooperatively provides the functionality of the distributed control system disclosed herein.

To further clarify embodiments disclosed herein, data flow diagrams in accordance with an embodiment are shown in FIGS. 2A-2C, 2F, and 4A. In the diagrams, flows of data and processing of data are illustrated using different sets of shapes. A first set of shapes (e.g., 202, 206, etc.) is used to represent data structures, a second set of shapes (e.g., 204, 208, etc.) is used to represent processes performed using and/or that generate data, and a third set of shapes (e.g., 216, etc.) is used to represent large scale data structures such as databases, repositories, image file storage, etc.

Figure 2A:
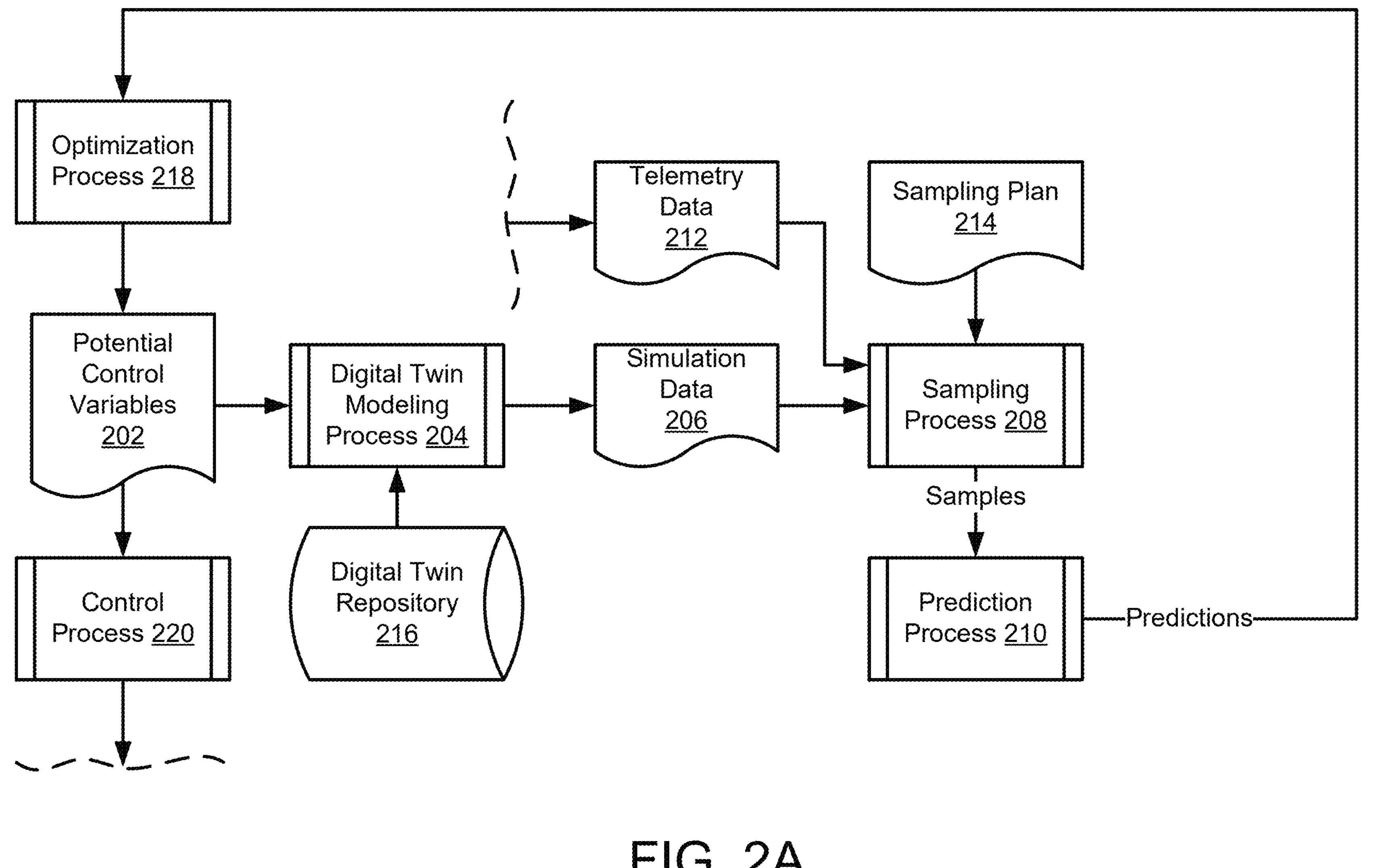
FIGS. 2A-2C, 2F, and 4A show diagrams illustrating data flows in accordance with an embodiment.

Turning to FIG. 2A, a first data flow diagram in accordance with an embodiment is shown. The first data flow diagram may illustrate data used in and data processing performed in management of distributed systems.

To manage operation of a system, a global control plane may perform the processes shown in FIG. 2A. The processes performed in FIG. 2A may facilitate (i) selection of control variables for management of the distributed system, and (ii) distribution of the control variables (e.g., to local control planes, to service devices, etc.). To select the control variables, sets of potential control variables 202 (e.g., global control variables may be iteratively selected and evaluated. When a set of potential control variables is found that meets certain criteria, the potential control variables may be selected for use in managing operation of the distributed system.

For example, once selected, the selected control variables may be used during control process 220. During control process 220, the control variables may be (i) distributed to other entities (e.g., local control planes, service devices, etc.), (ii) used as a basis for selecting instructions, assignment, and/or other imperatively defined activities (e.g., information regarding the imperative statements may be distributed to guide system operation), (iii) used as a basis for selecting goals and/or other declaratively selected states (e.g., information regarding the states may be distributed to guide system operation), and/or otherwise used to manage the system.

For example, the control variables may be used by other components of the system to guide their operation. The control variables may define aspects of the operation of the other components of the system.

To ascertain whether the potential control variables 202 are acceptable, the likely outcomes of using the variables may be compared, for example, to system operational goals. The system operational goals may be defined, for example, based on requests from the client devices such as for performance of workloads, accomplishing goals, providing services, etc. The likely outcome may be compared to the system operational goals using any standard, and the system operational goals may include any quantity and type of information and may be defined in any manner.

A set of control variables (or a portion thereof) may be used to manage the system during a period of time (e.g., a time window). Once the window is complete, a new set of values for the control variables may be calculated and used to manage the operation of the distributed system. It will be appreciated that a set of potential control variables may include potential control variables for multiple time windows (e.g., multiple control windows).

Once a set of potential control variables (e.g., 202) is identified, the potential control variables may be evaluated using a hybrid predictive approach utilizing (i) digital twin simulation for validation purposes, and (ii) predictive algorithms to infer future operation of the distributed system.

For example, when potential control variables 202 are obtained, digital twin modeling process 204 may be performed. During digital twin modeling process 204, any number of digital twins may be operated to simulate the likely operation of the system under influence of the potential control variables.

For example, during digital twin modeling process 204, digital twins of the global control plane, the local control planes, service devices, and/or other components of the system of FIG. 1A may be operated. During such operation, potential control variables 202 may be used as input to simulate operation of the system of FIG. 1A under the influence of the potential control variables 202. Each digital twin (e.g., from digital twin repository) 216 may be a digital simulation of a corresponding component with the ability to customize the simulated behavior with different control variables.

During the operation of the digital twins, various characteristics of the operation may be monitored and stored as simulation data 206. For example, the digital twins may be operated over a period of time.

As a basis of comparison, similar characteristics of the actual operation of the system (e.g., during the period of time) over time may also be monitored. Telemetry data 212 reflecting these characteristics may be obtained by the global control plane.

Once obtained, sampling process 208 may be performed. During sampling process 208, samples of simulation data 206 may be selected for use in prediction processes. The specific selections may be made based on sampling plan 214. Sampling plan 214 may define which selections are to be made. The selections may be made based on any scheme.

Additionally, sampling plan 214 may define samples of errors signals to be obtained for use in prediction process 210. For example, sampling plan 214 may indicate differences between simulation data 206 and telemetry data 212 that are to be calculated as additional samples. In this manner, differences between the operation of the digital twins and the actual distributed system may be identified and taken into account in prediction process 210.

Further, the error samples calculated via sampling process 208 may also be used as a basis for ascertaining whether a set of potential control variables 202 are acceptable for use in managing operation of the distributed system. For example, control process 220 may utilize criteria that requires the error samples to be below a threshold level. The threshold level may be granular (e.g., a per characteristic basis), or macro (e.g., aggregate differences).

If the error samples are above a threshold level, the digital twins may be revised. For example, if the error samples exceed the threshold level, then differences between the digital twins and actual distributed system operation may be analyzed (e.g., automatically and/or with subject matter expert assistance) to revise the digital twin models. Once revised, the simulation data (e.g., 206) may be re-calculated.

Once the samples are obtained, prediction process 210 may be performed. During prediction process 210, predictions of future operation of the distributed system may be generated. Any number of separate predictions may be generated, and each prediction may be ascribed a corresponding likelihood of occurring.

The predictions may be generated using an inference model (e.g., trained machine learning model, logic tree model, regression model, etc.) that predicts both future operation and likelihood of occurrence. The inference model may be a trained model using labeled data from previous operation of the distributed system under influence of various sets of different control variables.

The resulting predictions may be for multiple time windows (e.g., beyond the control window for which the potential control variables being selected will control the operation of the system). It will be appreciated that any number of predictions may be obtained via prediction process 210.

Once the predictions are obtained, optimization process 218 may be performed. During optimization process, an objective optimization reasoning engine may used to (i) identify the most likely future operation of the system (e.g., from the predictions), and (ii) select additional potential control variables. Other optimization process may be performed without departing from embodiments disclosed herein.

To select the most likely future operation, the predictions may be ranked based on the likelihood of occurrence, and the highest ranked may be selected.

Once the prediction is selected, an optimization process may be performed using a set of equations, constraints, and an objective optimization function, each of which is discussed below.

The set of equations may include state equations, and output state equations. The state equation may be: x(k+1) =Ax(k)+Bu(k)+Sd(k). The output state equation may be:

$$y(k) = Cx(k) + Du(k) + S'd(k).$$

The constraints may include: x_min≤≤x(k+i|k)≤x_max, i=1, . . . . $N_p$–Predicted input dependent variable at time k+i|k given information at k, u_min≤u(k+i−1|k)≤u_max, i=1, . . . . $N_u$, y_min≤y(k+i|k)≤y_max, i=1, . . . . $N_p$, and $$u(k+i-1 \mid k) = \sum_{zint=1}^{L} \text{zint\_m}\, u1 \ \ldots\ L,$$

i=1, . . . . Nu–Predicted input at time k+i−1 given information at k, weighted sum of discrete input options the binary integer decision variables are weights, and $$u \sum_{m=1}^{L} zint = 1$$

—Only one of the discrete options is selected at time k+i.

The objective function may be:

$$J(k) = \sum_{i=1}^{Np-1} \Big\{ (y(k+i \mid k) - ry(k+i \mid k))^T Q (y(k+i \mid k) - ry(k+i \mid k)) + (u(k+i-1 \mid k) - ru(k+i-1 \mid k))^T R \, (u(k+i-1 \mid k) - ru(k+i-1 \mid k) + \Delta u(k+i-1 \mid k))^T S(\Delta u(k+i \mid k)) + \lambda \sum (\text{int} = 1 \text{ to } m)\, \text{z\_int}(k) \Big\}$$

In the above equations, the following may apply:

k—sample time point.

i—prediction time point step.

$N_u$—control horizon.

$N_p$—prediction horizon.

x—system state vector variable.

y—output dependent variable of system measured state vector.

ŷ—predicted output system state dependent variable state vector.

ry—reference/target system output variable state vector.

u—control action independent input vector.

ru—reference/target control action independent input vector.

Au—is the allowable change in u from k−2->k−1.

A—State matrix represent the state dynamics of system and evolution to the next state x(k)->x(k+1).

B—Control input matrix reflects state dynamics describe the relationship between the inputs and next state u(k)->x(k)|x(k+1).

C—Output state matrix represents how the states are mapped to the outputs x(k)->y(k).

D—Feedthrough matrix from inputs to outputs direct influence of the inputs on the outputs u(k)->y(k).

Q—Weighting matrix on the state and output tracking error, provides penalty between predicted and reference trajectory states y(k+i|k)−ry(k+i|k)

R—Weighting matrix representation on control inputs that penalizes control function in the objective function.

S—Disturbance weighting matrix at time k represents of disturbance S' represents future weightings.

$n_o$—Noise/output (observation error, observation noise, epistemic noise).

$n_i$—Noise/input (environment noise, input workload variation, aleatoric noise).

d-disturbance (system impairment, system failure verified by anomaly detection, OOD telemetry, epistemic noise).

l—Weighting factor for the integer variables z_int—binary integer variable that represents a decision or selected operation mode at time k+i given information at time k.

L—number of discrete input selection options.

m—number of binary integer variables for each input selection.

Thus, using the above objective function and an optimization algorithm (e.g., local, global, etc.), values for various control variables (e.g., $\hat{y}$) may be obtained.

Once obtained, the newly obtained potential control variables may be either (i) used to confirm that the previous potential control variables are acceptable (e.g., changed by less than a threshold value) or (ii) use to replace the previous potential control variables. Similarly, the new control variables may be used to revise any of the digital twins stored in digital twin repository 216. For example, a magnitude of the value of the objective function corresponding to the newly identified control variables may be used to update aspects of the digital twin models of the components of the system of FIG. 1A.

If selected for use, control process 220 may, as noted above, use the potential control variables to manage operation of the system during a next window. For example, control process 220 may distribute information to the local control planes which may use the information to perform another selection process for additional control variables. The additional control variables may, in turn, be pushed down to service systems for using in operation of each of the service systems.

Thus, in this manner, the system of FIG. 1A may continuously revise its operation based on predicted future operation of the system, changing operation of the system over time, changing workload requirements, etc. Further, by utilizing both digital twin models and predictive models, the accuracy of predictions as well as computational efficiency of generating such predictions may be improved.

To facilitate updating of operation of the distributed system, global and local control planes may cooperate to orchestrate operation of the system. As noted above, the global control plane may make higher level decisions, and information regarding these decisions (e.g., in the form of control variables) may flow down to local control planes. The local control planes may, taking into account the higher level decisions, manage service and/or management devices in the respective zones.

Figure 2B:
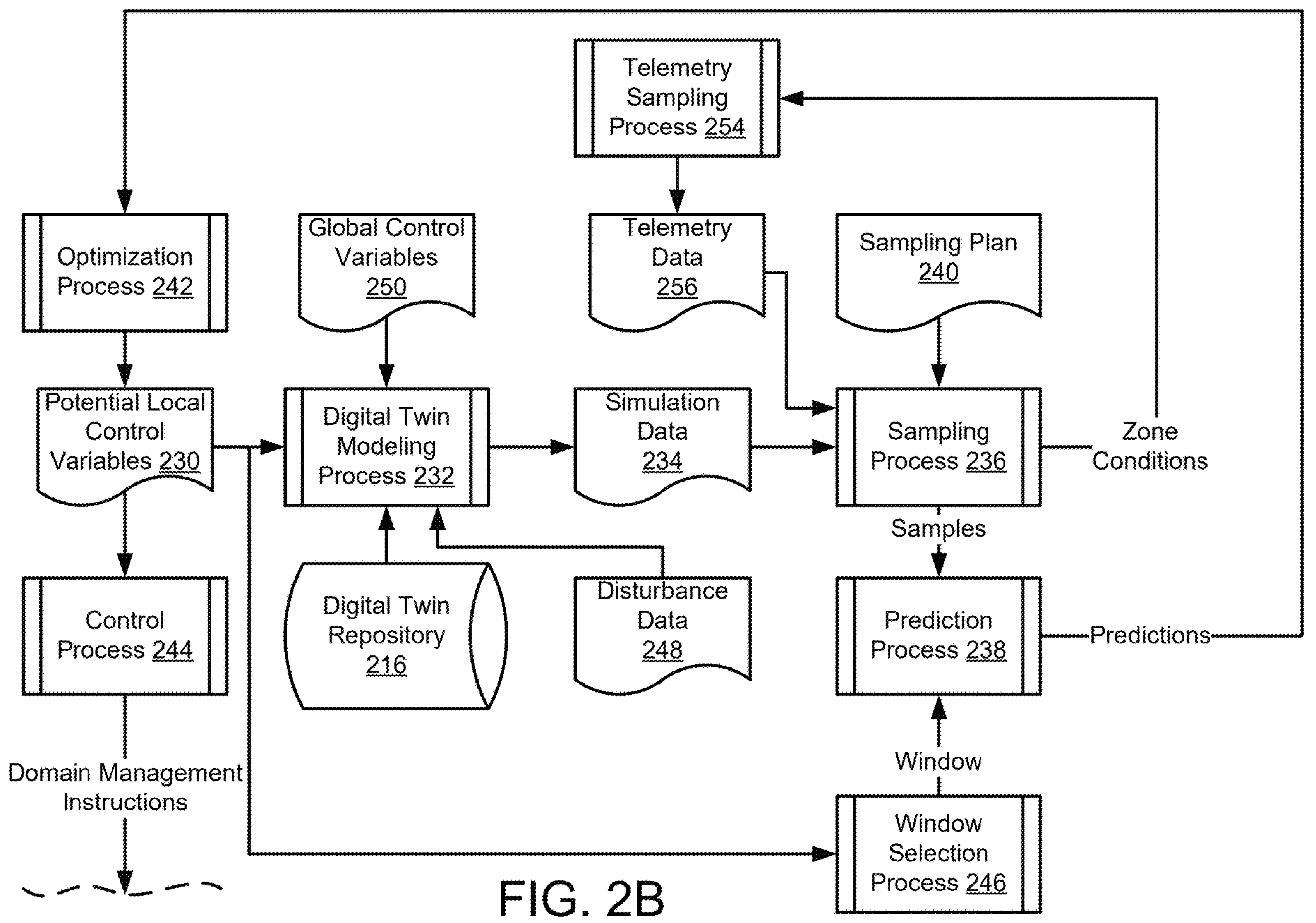

Turning to FIG. 2B, a second data flow diagram in accordance with an embodiment is shown. The second data flow diagram may illustrate data used in and data processing performed in management of respective local zones of a distributed system.

To manage operation of a local zone of a distributed system, a local control plane may perform the processes shown in FIG. 2B. The processes performed in FIG. 2B may facilitate (i) selection of control variables for management of service and/or management devices within the zone, and (ii) distribution of the control variables (e.g., to service devices, etc.) or information based on the control variables. To select the control variables, sets of potential local control variables 230 (e.g., local control variables may be iteratively selected and evaluated). When a set of potential local control variables is found that meets certain criteria, the potential local control variables may be selected for use in managing operation of the local zone.

For example, once selected, the selected local control variables may be used during control process 244. During control process 244, the local control variables may be (i) distributed to other entities (e.g., service devices, etc.), (ii) used as a basis for selecting instructions, assignment, and/or other imperatively defined activities (e.g., information regarding the imperative statements may be distributed to guide system operation), (iii) used as a basis for selecting goals and/or other declaratively selected states (e.g., information regarding the states may be distributed to guide system operation), and/or otherwise used to manage the local zone.

For example, the local control variables may be used by service devices of the local zone to guide their operation. The local control variables may define aspects of the operation of the service devices include, for example, management of (i) applications (e.g., numbers, types, configurations), (ii) infrastructure (e.g., power states, configurations, firmware, etc.), (iii) orchestration (e.g., declarative/imperatively defined activities by the local control plane), (iv) choreography (e.g., process for interacting with other system components without explicit instructions from the local control plane), (v) infrastructure management (e.g., imperative placement of service devices into particular states, network management, power system management, etc.), and/or other aspects of operation of components of the distributed system that are within a local zone. The local control variables, and/or information based on the local control variables, may be used by the service devices and/or management systems to guide their operation.

To ascertain whether potential local control variables 230 are acceptable, the likely outcomes of using the local control variables may be compared, for example, to operational goals for the local zones. The system operational goals may be defined, for example, based on (i) requests from the client devices such as for performance of workloads, accomplishing goals, providing services, etc., (ii) global control variables 250 and/or other information obtain from a global control plane (e.g., which may define goals/desirable outcomes), and/or other information. The likely outcome may be compared to the system operational goals using any standard, the system operational goals may include any quantity and type of information, and may be defined in any manner.

A set of potential local control variables (or a portion thereof) may be used to manage the local during a period of time (e.g., a control window). Once the control window is complete, a new set of values for the local control variables may be calculated and used to manage the operation of the local zone. It will be appreciated that a set of potential local control variables may include potential control variables for multiple control windows. As will be discussed further below, the prediction process (e.g., 238) may generate predictions for multiple control windows when a new set of local control variables are being selected for a single control window.

Once a set of potential local control variables (e.g., 232) is identified, the potential control variables may be evaluated using a hybrid predictive approach utilizing (i) digital twin simulation for validation purposes, and (ii) predictive algorithms to infer future operation of the distributed system.

For example, when potential local control variables 230 are obtained, digital twin modeling process 232 may be performed. During digital twin modeling process 232, any number of digital twins may be operated to simulate the likely operation of the system under influence of the potential local control variables, global control variables 250 selected for the control window by a global control plane, information regarding disturbances of devices within the local zone, and/or other information.

For example, during digital twin modeling process 232, digital twins of the local control plane, service devices, and/or other components of the system of FIG. 1A present within a local zone may be operated. During such operation, potential local control variables 230 may be used as input to simulate operation of the system of FIG. 1A under the influence of the potential local control variables 230. Each digital twin (e.g., from digital twin repository) 216 may be a digital simulation of a corresponding component in the local zone with the ability to customize the simulated behavior with different local control variables, global control variables, disturbances, etc.

For example, to appropriately reflect operation of the devices within the local zone, operation of the devices may be monitored for disturbances (e.g., anomalous behavior, may reflect impairments of the system beyond that which is explicitly modeled by the digital twin models). When such disturbances are identified, disturbance data (e.g., 248) may be obtained and integrated into operation of the digital twins. The digital twins may, take as input, the disturbance data and modify their operation accordingly to take into account the impairment of the corresponding devices (e.g., impairments may be stochastic events that may not be able to be directly modeled, but impacts of such impairments on future operation may be able to be modeled using the digital twins, thus, when such impairments are identified through monitoring the operation of the corresponding digital twin may be modified to predict the impaired operation of the device rather than prediction of non-impaired operation). In other words, each digital twin model may be configurable to simulate the activity of impaired and non-impaired devices within a local zone.

During the operation of the digital twins, various characteristics of the operation may be monitored and stored as simulation data 234. For example, the digital twins may be operated over a period of time.

As a basis of comparison, similar characteristics of the actual operation of the system (e.g., during the period of time) over time may also be monitored. Telemetry data 256 reflecting these characteristics may be obtained by the global control plane.

Telemetry data 256 may be obtained via telemetry sampling process 254. During telemetry sampling process, information regarding the operation of devices within the local zone may be obtained. A rate at which the telemetry data is obtained may be based on conditions within the zone. The zone conditions may include, for example, stability of operation of the zones over time, rates of workload performances, closeness of operating points of devices in the zones to operational limits of the devices, levels of importance of operation of each device to defined goals (e.g., specified by global control variables), and/or other factors. For example, a quantification function may ingest the information and output a quantification (e.g., a scalar or vector value) of the relative zone conditions. The sampling rate (e.g., for the zone and/or for different devices within the zone, different devices may be sampled at different rates) may be based on the quantification. Generally, as the zone conditions improve (e.g., more stable), the lower the sampling rate and vice versa. The zone conditions may be obtained via sampling process 236 and/or via other processes.

Once the simulated and measured operation data for local zone are obtained, sampling process 236 may be performed. During sampling process 236, samples of simulation data 234 may be selected for use in prediction processes, and/or zone conditions may be identified (e.g., based on the sampled data). The specific selections may be made based on sampling plan 240. Sampling plan 214 may define which selections are to be made. The selections may be made based on any scheme.

Additionally, sampling plan 240 may define samples of errors signals to be obtained for use in prediction process 238. For example, sampling plan 240 may indicate differences between simulation data 234 and telemetry data 256 that are to be calculated as additional samples. In this manner, differences between the operation of the digital twins and the actual distributed system may be identified and taken into account in prediction process 238.

Further, the error samples calculated via sampling process 236 may also be used as a basis for ascertaining whether a set of potential local control variables (e.g., 230) are acceptable for use in managing operation of the local zone. For example, control process 244 may utilize criteria that requires the error samples to be below a threshold level. The threshold level may be granular (e.g., a per characteristic basis), and/or macro (e.g., aggregate differences).

If the error samples are above a threshold level, the digital twins may be revised. For example, if the error samples exceed the threshold level, then differences between the digital twins and the actual (corresponding) local zone operation may be analyzed (e.g., automatically and/or with subject matter expert assistance) to revise the digital twin models. Once revised, the simulation data (e.g., 234) may be re-calculated.

Once the samples are obtained, prediction process 238 may be performed. During prediction process 238, predictions of future operation of the distributed system may be generated. Any number of separate predictions may be generated, and each prediction may be ascribed a corresponding likelihood of occurring.

The predictions may be generated using an inference model (e.g., trained machine learning model, logic tree model, regression model, etc.) that predicts both future operation and likelihood of occurrence. The inference model may be a trained model using labeled data from previous operation of the distributed system under influence of various sets of different control variables, via semi-supervised learning, via unsupervised learning, and/or via other processes (e.g., similar inference models used by the global control plane may be similarly implemented).

The resulting predictions may be for multiple time windows (e.g., beyond the control window for which the potential control variables being selected will control the operation of the system). The duration of the time window for prediction may be selected via window selection process 246. It will be appreciated that any number of predictions may be obtained via prediction process 210. For example, multiple inference models and/or inference models that predict multiple, different future operation scenarios for the local zone may be used to obtain the multiple predictions.

To select the duration of prediction, window selection process 246 may be performed. During window selection process 246, stability of operation of the local zone and/or control over operations of the local zone may be taken into account. For example, sets of potential local control variables used to manage the local zone over time may be analyzed (e.g., a gradient may be calculated). The sets may be used to estimate stability of the zone and/or control over the local zone. The gradient may indicate such levels of stability (e.g., larger gradient may indicate reduced stability while a lower gradient may indicate improved stability). The level of stability in the zone may be used to select the duration of the window for prediction. Generally, the duration of the window may increase as stability decreases, and the window may decrease as the local zone stability increases. While not shown, the duration of the control windows used by control process 244 may similarly scale, or may scale differently (e.g., control windows may be reduced in size with reduced stability and may increase in size with improved stability).

Once the predictions are obtained, optimization process 242 may be performed. During optimization process 242, an objective optimization reasoning engine may be used to (i) identify the most likely future operation of the local zone (e.g., from the predictions), and (ii) select additional potential local control variables. Other optimization processes may be performed without departing from embodiments disclosed herein. Optimization process 242 may be similar to optimization process 218. Refer to the corresponding description of FIG. 2A for additional details. Thus, values for various local control variables (e.g., 9) may be obtained via optimization process 242.

Once obtained, the newly obtained potential local control variables may be (i) used to confirm that the previous potential local control variables are acceptable (e.g., changed by less than a threshold value), and/or (ii) used to replace the previous potential local control variables. Similarly, the new local control variables may be used to revise any of the digital twins stored in digital twin repository 216. For example, a magnitude of the value of the objective function corresponding to the newly identified control variables may be used to update aspects of the digital twin models of the components of the system of FIG. 1A. While numbered similar in FIGS. 2A-2B, different digital twin repositories may be used by different control planes without departing from embodiments disclosed herein.

If selected for use, control process 244 may, as noted above, use the potential local control variables to manage operation of the system during a next control window. For example, control process 244 may distribute information to the service devices in the local zone, and/or otherwise provide information to the service devices based on the potential local control variables.

Thus, via the process illustrated in FIG. 2B, a local zone may manage operation of devices within the zone. The local zone may do so dynamically based on changing conditions (e.g., zone conditions) within the zone.

To perform the predictive control discussed with respect to FIGS. 2A-2B, predictions of future operation may need to be obtained (e.g., during prediction processes 210 and 238). To obtain such predictions, a predictive generative flow network may be used. The predictive generative flow network engine may (i) predict state transition flows using generative techniques, and (ii) simply the predicted state transition flows to obtain the predictions of the future operation of the distributed system and/or portions thereof. Use of the generative techniques may reduce computational resource cost for such predictions (e.g., when compared to deterministic approaches at scale), and simplification of the resulting graph data structures may greatly reduce the computational cost of evaluating the predictions of the future operation. Consequently, the technique may facilitate predictive control in low computing resource availability environments such as, for example, edge deployments where use of deterministic predictive techniques are precluded due to lack of computing resources.

Figure 2C:
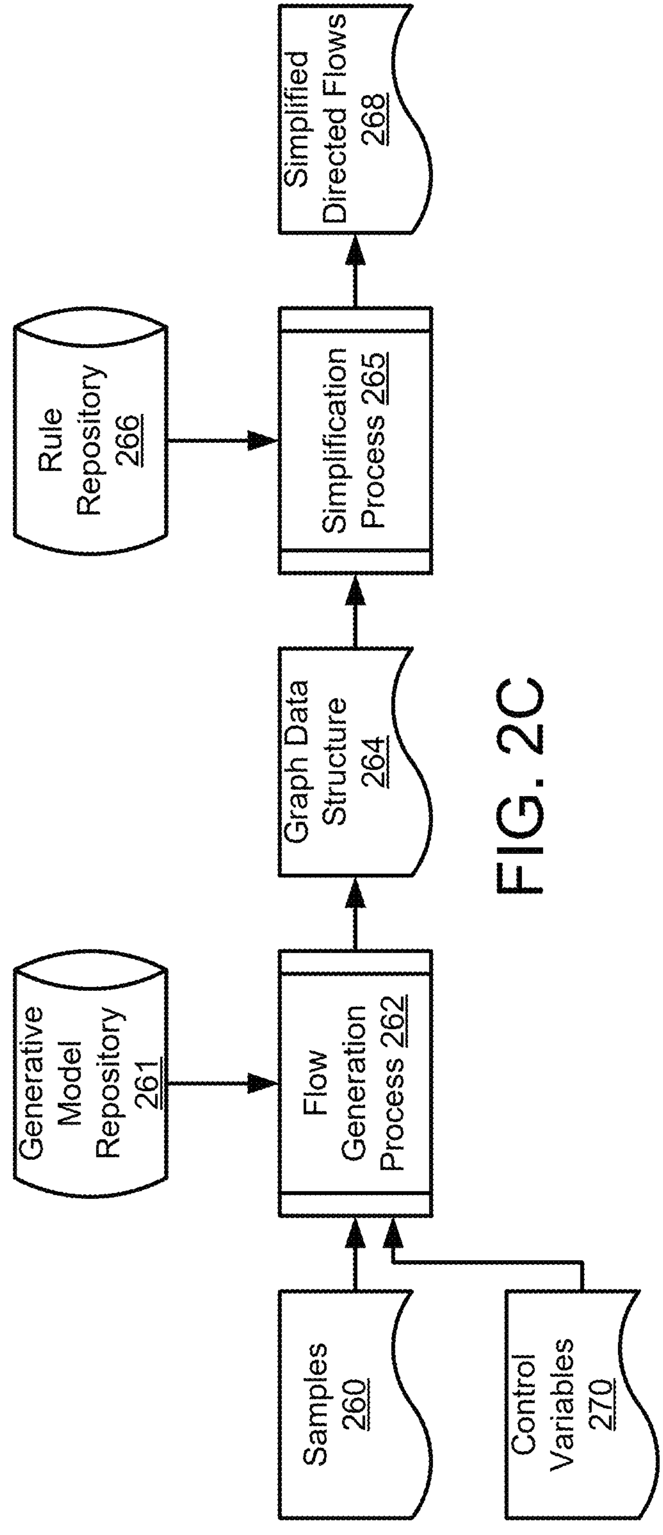

Turning to FIG. 2C, a third data flow diagram in accordance with an embodiment is shown. The third data flow diagram may illustrate data used in and data processing performed to predict future operation of a distributed system.

To predict the future operation, samples 260 may be obtained via sampling process 208 and/or sampling process 236, discussed above, and control variables 270 (e.g., local and/or global) may be obtained. Once obtained, the samples and control variables may be ingested by flow generation process 262.

During flow generation process 262, graph data structure 264 may be generated using a generative model from generative model repository 261. The generative model may be a generative flow network trained to predict states of a system over time, orderings between the states, and/or probabilities of entering each of the predicted states. To obtain the predictions, the generative model may solve for:

S=Finite set of discreet states represented as nodes. System State/Resource Variable A=Action that defines transition (s−s') based on transition probability graph edges. Ctrl Variable G=Directed Acyclic Graph $s_n \neq s_0$ and $s_n < s_{n+1}$ represents all initial, transition, terminal & final S/A.

T=Trajectory set of state nodes such that $(s_0, s_1, \ldots s_f)$ where $s_n < s_{n+1}$.

F=Flow is Function representing the probability of Trajectory within the DAG transiting an edge formally defined as a measure in s-algebra $S=2^T$. F is Markovian in our invention.

$P_F$=Forward transition probability function, $\forall s \in S | \{s_f\}$, $\Sigma_{sn \in Child(sn+1)} P_F(s_{n+1}|s_n)=1$.

$P_B$=Backward transition probability function, $\forall s \in S | \{s_0\}$, $\Sigma_{sn+1 \in Parent(sn)} P_B(s_n|s_{n+1})=1$.

(G,F)=Flow Network, defines a measure space (probability space)

To solve for the above variables, an energy based training model—$P\Theta(s)=e^{-\varepsilon\theta(s)}/Z$ may be used where the GFlowNet terminating probabilities are sampled and trained with reward function $R(s)=e^{-\varepsilon\theta(s)}$ which is based on the observed and modeled global/edge zone variable response normalized with energy function. This solution provides a $P_T(s)$. Stochastic Gradient Descent is then be used to estimate the negative log likelihood $(\partial - \log P\Theta(x))/\partial\Theta = \partial\varepsilon\Theta(x)/\partial\Theta - \Sigma P\Theta(s)(\partial\varepsilon\theta(s)/\partial\Theta)$. The second term can be estimated sampling $P_T(s)$ from the GFlowNet and substituting for s. This allows joint training of the energy function and GFlowNet by alternating samples of est $P_T(s)$ and using output to update the terminal reward. This approach solves for continuous and discrete variables and enables active learning by sampling online for better parameterization. Because the reward function is not deterministic as the setpoint output variables are changed on context two neural networks will be required for parameter estimation (e.g., 1 for energy function and 1 for GFlowNet).

Figure 2D:
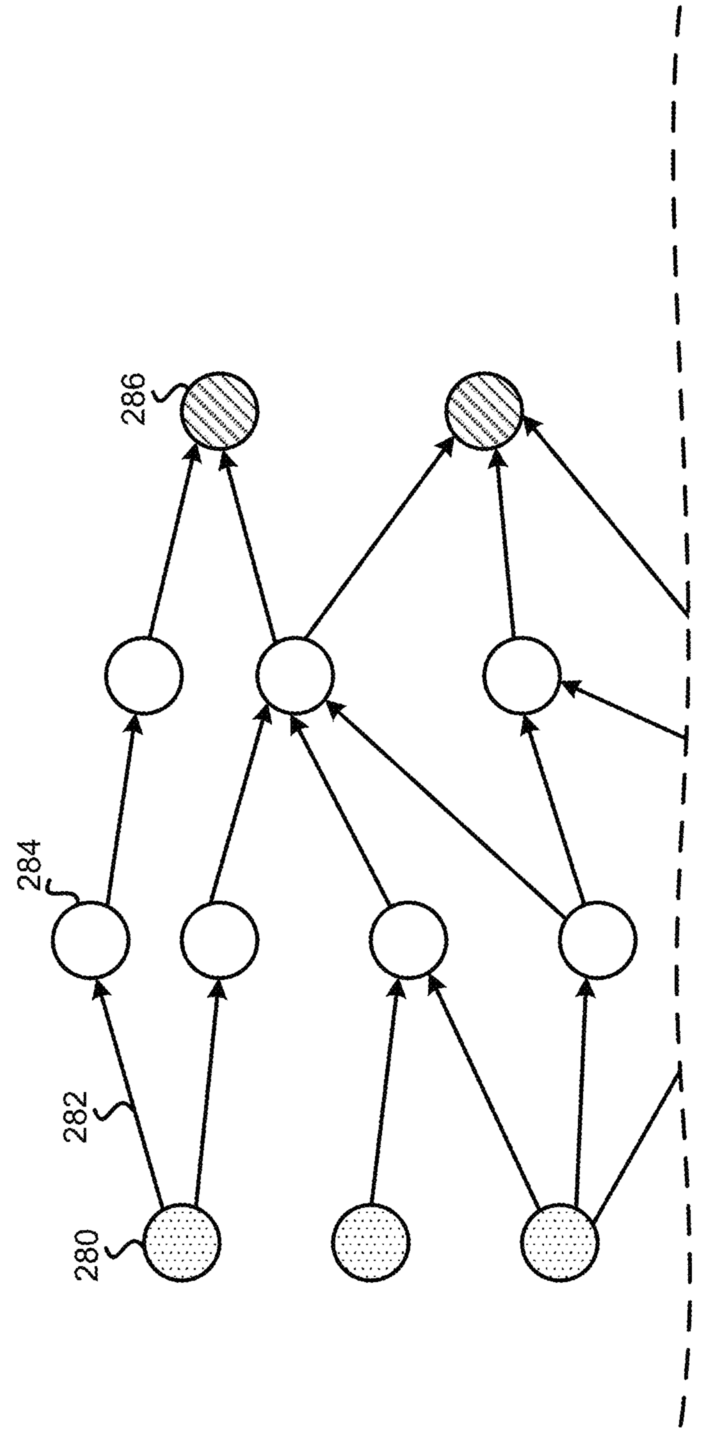

The result of performing the above optimization process is a set of initial states, a set of intermediate states, and a set of final states. Refer to FIG. 2D for additional information regarding representations of these states. Additionally, ordering and likelihood of occurrence may also be obtained.

Once graph data structure 264 is obtained, simplification process 265 may be performed to obtain simplified directed flows 268. During simplification process 265, rules from rule repository 266 may be applied to reduce complexity of graph data structure 264. The results may include mesh analysis of graph data structure 264, establishment of sets of linear equations based on identified meshes, and solving of the aforementioned equations to reduce a complexity of graph data structure 264 to obtain simplified directed flows 268.

Figure 2E:
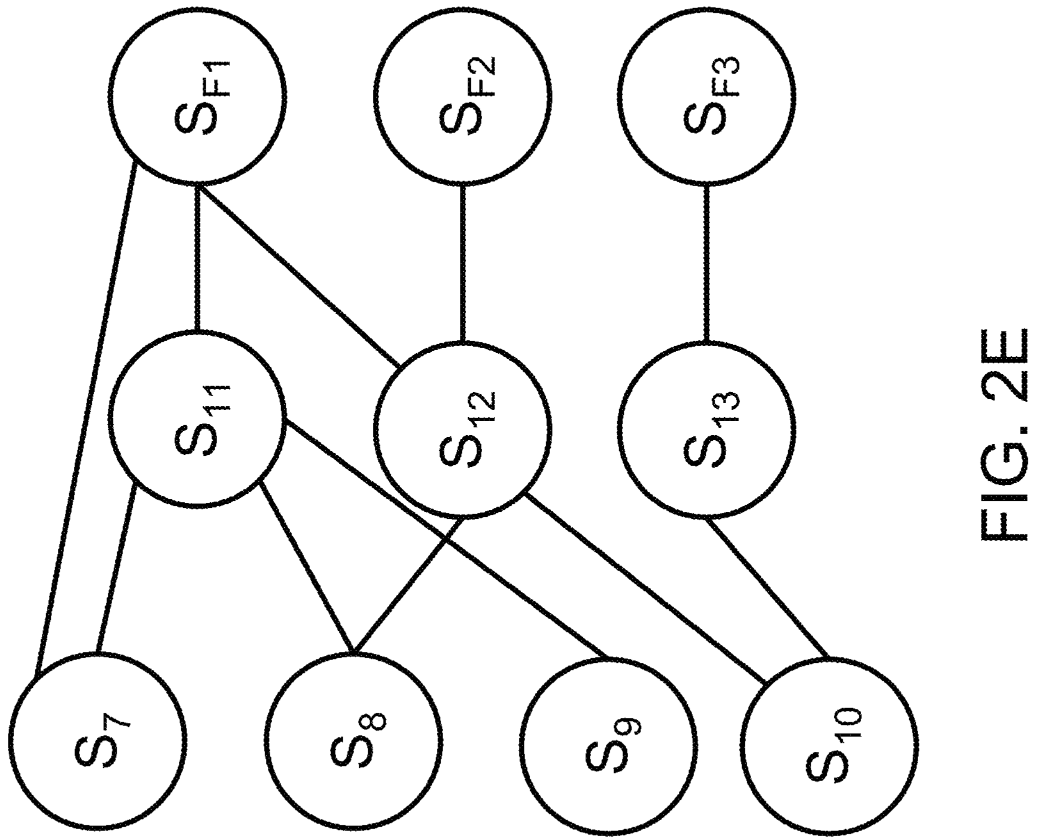

For example, turning to FIG. 2E, a diagram of a set of example nodes (e.g., S7-S13, and SF1-SF3) and edges in accordance with an embodiment is shown. Such a set of nodes may appear in a graph data structure and may include internal loops making analysis of the graph data structure computationally expensive.

To reduce the complexity of the analysis, meshes (e.g., as defined by Kirchoff's theorem) may be identified (e.g., such as closed loop S7, S11, SF1, and S7). For each mesh, an equation describing the relationships present in the mesh may be established. In this example, the equations may include:

$$\text{Mesh 1}: (S_7 - S_{11}) = S_{F1-S7}$$

$$\text{Mesh 2}: S_7 + S_8 + S_9 + S_{10} - (S_{F1} - S_7) - (S_8 - S_{12}) - (S_{10} - S_{13}) = S_{F1-S11}$$

$$\text{Mesh 3}: S_8 + S_{10} - (S_8 - S_{11}) - (S_{10} - S_{13}) = S_{F1-S12}$$

$$SF1: S_{F1} = S_{F1-S7} + S_{F1-S11} + S_{F1-S12}$$

$$\text{Mesh 4}: S_8 + S_{10} - (S_8 - S_{11}) - (S_{10} - S_{13}) - S_{F1-S12} = S_{F2}$$

$$\text{Mesh 5}: S_{10} - (S_{10} - S_{12}) = S_{F3}$$

The above system of linear equations may then be solved to establish a direct flow structure that eliminates the actions and intermediate states. This simplified direct flow structure may then be directly analyzed during optimization processes 218 and/or 242.

Turning to FIG. 2D, a diagram illustrating a portion of an example of graph data structure 264 in accordance with an embodiment is shown. The aforementioned portion may include any number of initial state nodes (e.g., 280), any number of intermediate state nodes (e.g., 284), and any number of final state nodes (e.g., 286). Additionally, any number of edges (e.g., 282) may also be present.

Each of the nodes may represent a predicted future state. Each of the edges represent a transition and/or ordering between the predicted future states. Additionally, while note shown, a probability of the state occurring and/or edge being traversed may also be calculated. As seen in FIG. 2D, the graph data structure may be a directed acyclic graph representing different sets of potential state transitions. The generative model may predict the numbers and types of nodes and edges in the graph, as noted above by solving the sets of equations.

Once the simplified directed flows are obtained, decisions regarding how to manage operation of the distributed system may be made via evaluation of these simplified directed flows. To do so, an objective reasoning engine may be used.

Figure 2F:
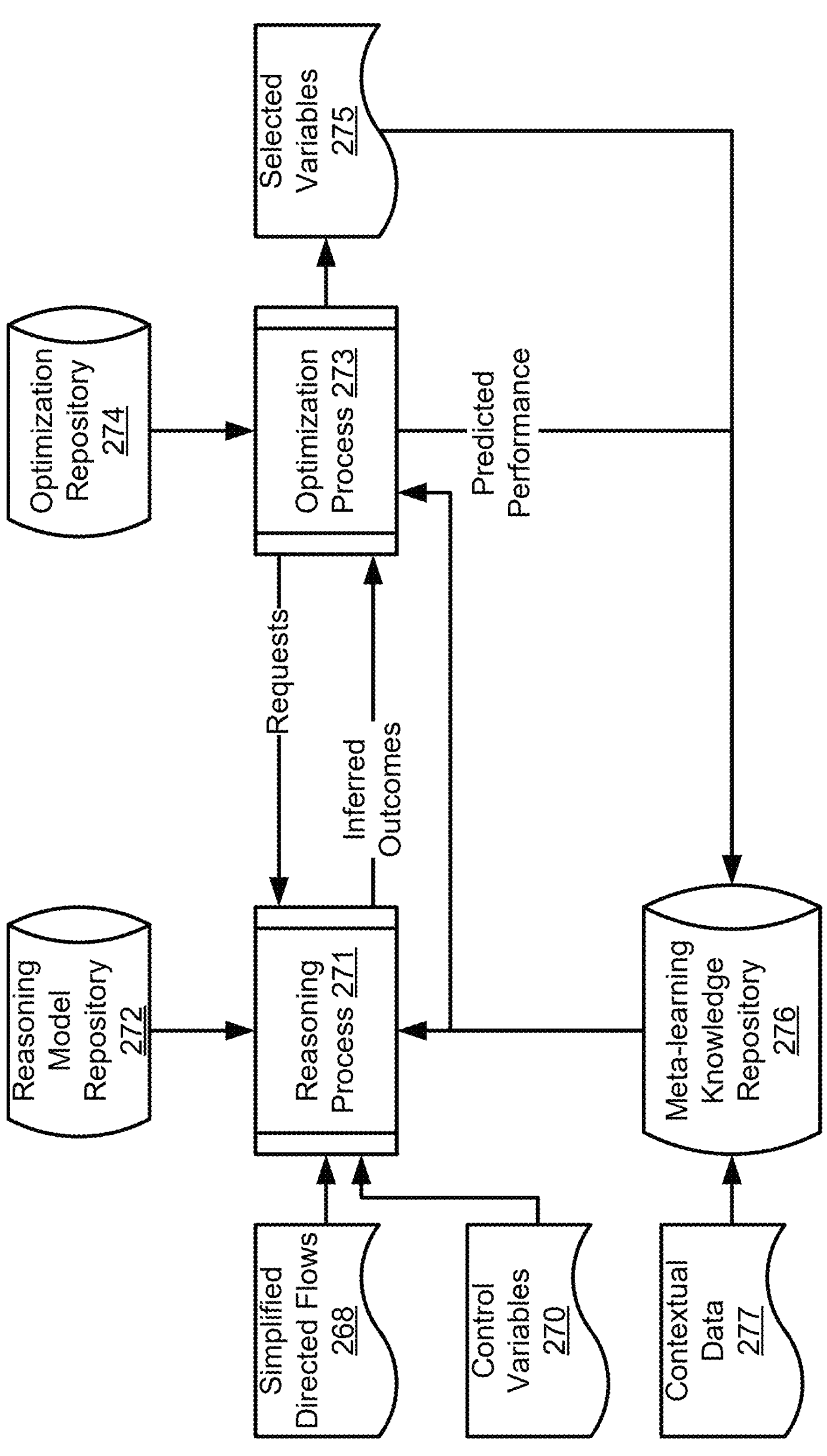

Turning to FIG. 2F, a fourth data flow diagram in accordance with an embodiment is shown. The fourth data flow diagram may illustrate data used in and data processing performed to select potential control variables. The flows may be used, for example, during optimization process 218 and/or optimization process 242.

To select potential control variables (e.g., selected variables 275), optimization process 273 may be performed. During optimization process 273, an optimization process may be performed using an objective function.

The objective function may quantify desirability of different control variables. The objective function may evaluate over a duration of the prediction window using the prediction processes to obtain the predicted performance of operation (e.g., the prediction window may be longer than the control window during which selected control variable values will govern operation).

To evaluate different sets of control variables, optimization process 273 may issue various requests to reasoning process 271, and reasoning process may provide inferred outcomes (e.g., performance over time) for the set of control variables. The inferred outcomes may be ingested into the objective function to obtain a quantification for corresponding sets of control variables.

Reasoning process 271 may use neuro symbolic reasoning (or other inferencing processes) to infer outcomes for the sets of control variables. To do so, a trained model from reasoning model repository 272 may be used. The trained model may generalize relationships between simplified directed flows 268 and control variables 270, may make inferences based on the temporal relationships defined by simplified directed flows 268, and/or may otherwise make inferences using the aforementioned information (and/or other information).

For example, reasoning process 271 may use neural architecture (e.g., a trained neural network) to interpret perceptual data (e.g., 268, 270) as symbols, and relationships may be reasoned about symbolically. As part of the perception process, information from meta-learning knowledge repository 276 may be used to enhance the inferred relationships.

Meta-learning knowledge repository 276 may include information regarding previously selected variables, corresponding information regarding optimization process 273 leading to the selected variables (e.g., predicted performance for the selected variables), contextual data (e.g., 277, may include the simplified directed flow and/or control variables for the inferred outcome rated best by optimization process 273) corresponding to the inferred outcomes from reasoning process 271, and/or other information usable to improve the likelihood of accurately inferring outcomes for control variables requested by optimization process 273. For example, meta-learning knowledge repository 276 may include actual outcomes of use of control variables, whereas simplified directed flows 268 may include predicted performances only. Thus, the information in meta-learning knowledge repository 276 may be usable to correct or otherwise improve the accuracy of inferred outcomes even when some input to reasoning process 271 is inaccurate (e.g., simplified directed flows 268 may only be predictions).

Once selected variables 275 are obtained, potential control variables 202 and/or 230 may be obtained (e.g., may include them).

During reasoning process 271 and/or optimization process 273, global, local, and/or a combination of control variables may be selected. In other words, the objective function that is minimized may take into account constraints imposed global and/or local control planes.

Thus, using the flow shown in FIG. 2F, embodiments disclosed herein may enable control variables to be selected that are more likely to result in desirable operation of the distributed system. The disclosed embodiments may do so, for example, by integrating both predicted and actual performance of distributed system operation into the optimization process for control variable selection.

Once the control variables are selected, the control system may attempt to update operation of the distributed system using the control variables. For example, the control variables may be security distributed to components of the distributes system. When received, the receiving component may attempt to validate authenticity and/or integrity of the control variables (e.g., purported control variables) prior to use.

Figure 4A:
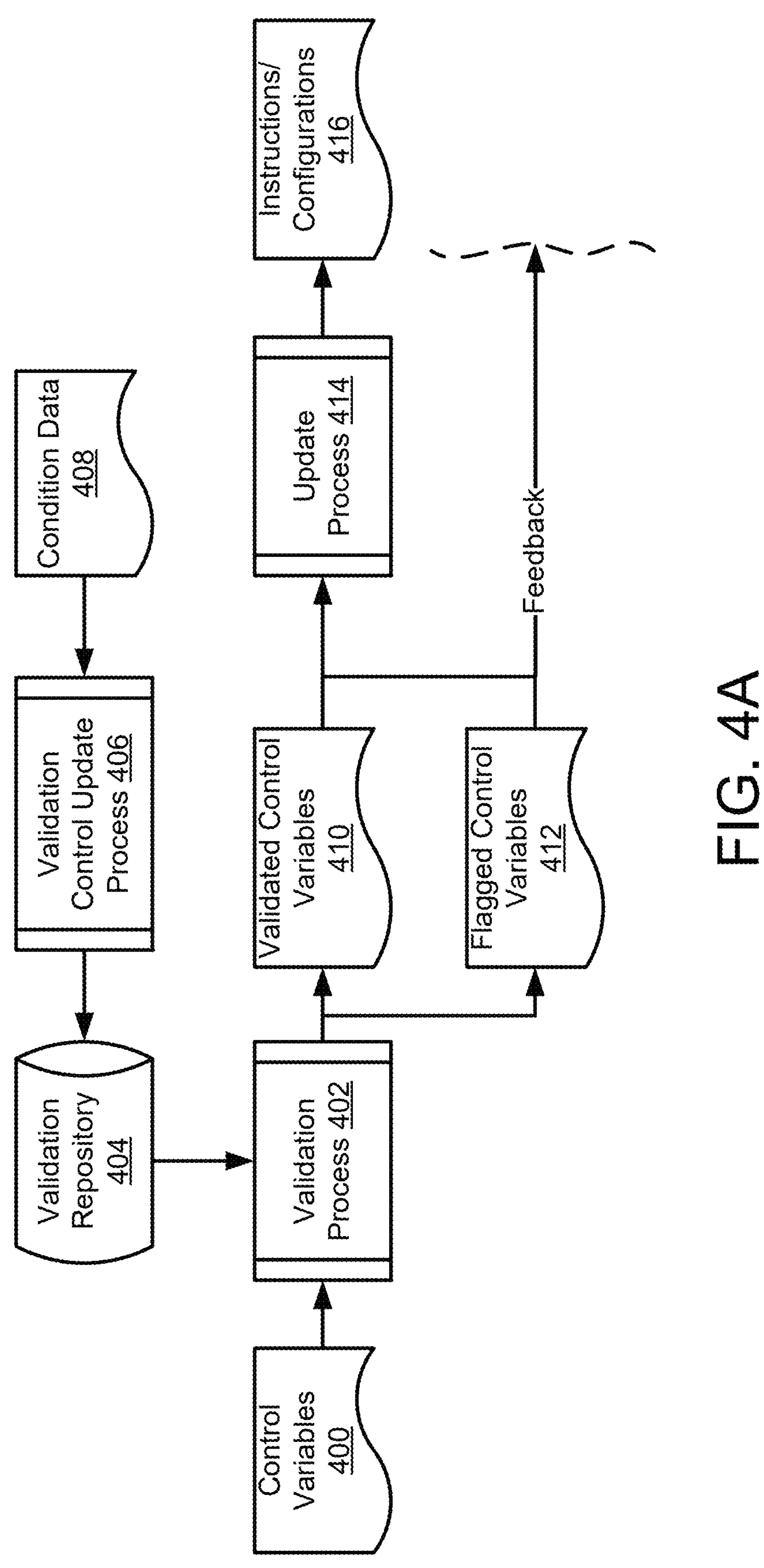

Turning to FIG. 4A, a fifth data flow diagram in accordance with an embodiment is shown. The fifth data flow diagram may illustrate data used in and data processing performed to update operation of the distributed system.

To update operation of the distributed system, a receiving device (e.g., a service device or management device) may obtain control variables 400 via a communication. The communication may be secure, may include some validation and/or integrity verification, etc.

Once received, the receiving device may perform validation process 402. During validation process 402, control variables 400 are evaluated for trustworthiness. Control variables deemed trustworthy may be categorized as validated control variables while control variables that are deemed untrustworthy may be categorized as flagged control variables 412.

To evaluate the trustworthiness of the control variables, dynamic criteria, thresholds, and/or other checking information may be obtained (e.g., from validation repository 404). The dynamic information may change based on conditions impacting the distributed system (and/or receiving device).

For example, the receiving device may monitor conditions impacting it and may store the information as condition data 408. Condition data may include any type of information (e.g., network condition data, workload data, resource availability data, security posture data, etc.) regarding the condition the receiving device and/or other components of the distributed system. The condition data 408 may be obtained via any type and number of monitoring processes.

Once obtained (e.g., over time), validation control update process 406 may be performed. During validation control update process 406, the content of validation repository 404 may be modified. For example, metadata indicating portions of validation repository 404 to use during validation process 402 may be updated based on condition data 408. Generally, the metadata may indicate that as distributed system is more likely to be exposed to threats, the higher the level of validation required for control variables to be deemed trustworthy. The sliding scale may be defined in any many, may be based on any number of data points and/or quantification scheme.

Validation repository 404 may include criteria (e.g., tests) and thresholds or other standards for the criteria. Each criteria and corresponding threshold may be associated with a different level of likelihood of threat exposure. Thus, relevant criteria and thresholds may be obtained from validation repository 404 based on the metadata updated by validation control update process 406 (e.g., may indicate level of exposure to threats).

While described with respect to threats, the validation control update process 406 may be multimodal, and take into account a range of conditions impacting the distributed system. Thus, threats, resources availability, workload, network connectivity, and/or other conditions impacting the distributed system may be taken into account when identifying relevant criteria and/or corresponding thresholds.

Once the criteria and/or thresholds are obtained, control variables 400 may be evaluated accordingly to categorize each control variable (e.g., into 410 or 412).

After categorization, information regarding the categorizations of the control variables may be provided as feedback to the digital twin predictive control system, which may use the information in selection of future control variables. Additionally, information regarding condition data 408 may also be provided. The aforementioned data used in optimization processes performed by the control system to select control variables 400. Consequently, the selected control variables may be more likely to meet the requirements of validation data from validation repository 404.

Additionally, validated control variables 410 and flagged control variables 412 may be used in update process 414. During update process, the operation of a device, system, or portion thereof, may be updated. The specific updates to be performed may be selected based on validated control variables 410. For example, known relationships between the validated control variables and actions to be performed or desired states to move towards regarding operation of the device may be available. Thus, these validated control variables may be directly translated to some instructions/configurations 416 for implementation via an automation framework (not shown, discussed above).

In contrast, flagged control variables 412 may be used as a basis for remediation processes where actions to be performed or states to be achieved are identified using the flagged control variables 412. For example, replacements for the flagged control variables 412 may be obtained (e.g., through generation synthetically with functions/inference models) and used to identify actions/states, result in the generation of corresponding instructions/configurations. It will be appreciated that flagged control variables 412 may be used in other ways as a basis for deciding how to update operation of the device without departing from embodiments disclosed herein.

Once the instructions/configurations 416 are obtained, automation frameworks or other entities may consume the instructions/configurations 416 and may update operation of the device accordingly.

Thus, via the method shown in FIG. 4A, control variables may be validated using dynamic criteria thereby reducing the susceptibility of compromise of the system (e.g., more scrutiny may be applied while more risk is present). Likewise, by using flagged control variables and/or corresponding conditions in selection of new control variables, the likelihood of selected control variables being flagged may be reduced.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1A may perform various methods to provide computer implemented services. FIGS. 3A-3E illustrates methods that may be performed by the components of FIG. 1A. In the diagrams discussed below and shown in FIGS. 3A-3E, any of the operations may be repeated, performed in different orders, and/or performed in parallel with or in a partially overlapping in time manner with other operations.

Figure 3A:
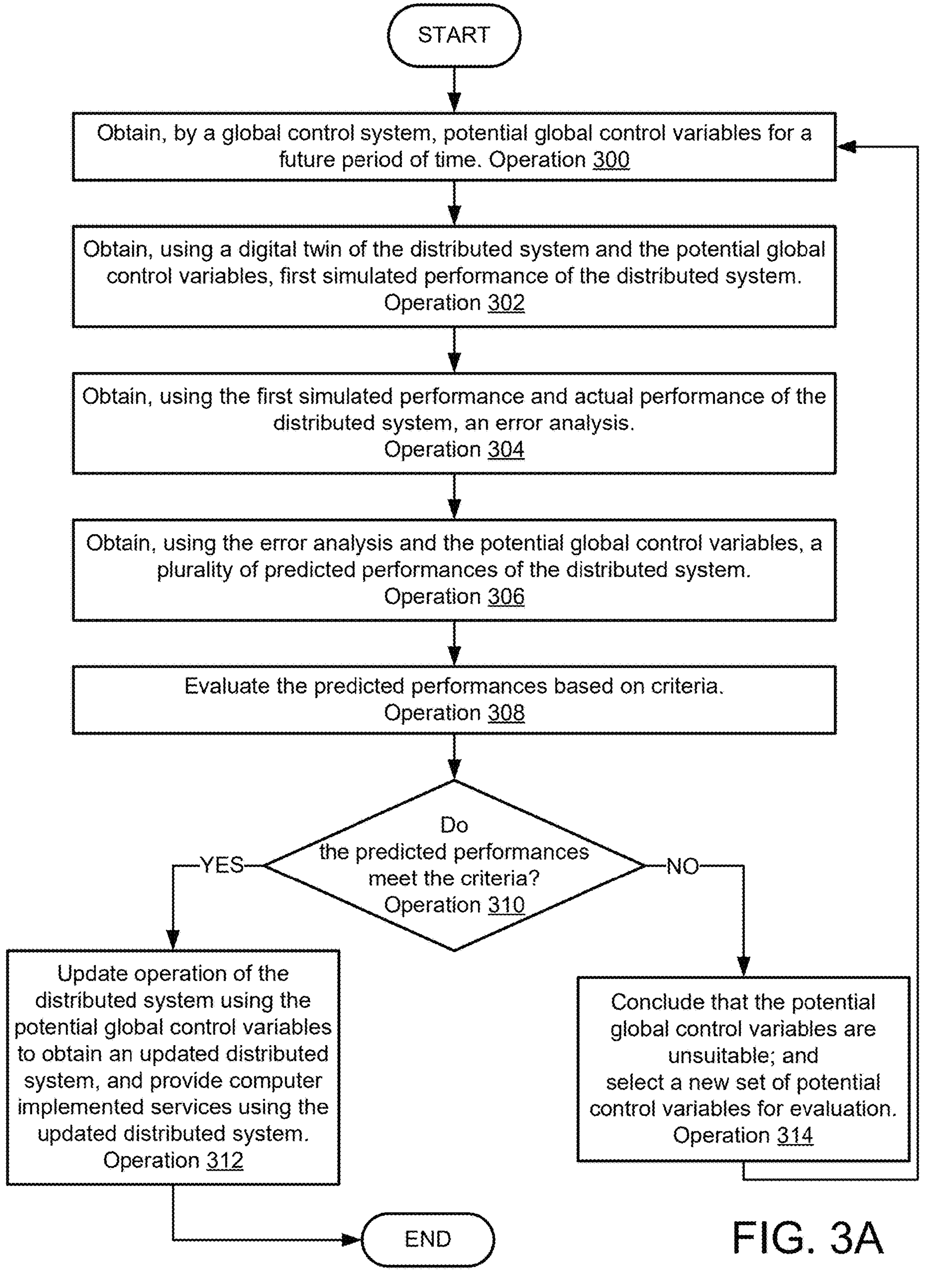
FIGS. 3A-3E show flow diagrams illustrating methods of providing computer implemented services in accordance with an embodiment.

Turning to FIG. 3A, a first flow diagram illustrating a method of providing computer implemented services in accordance with an embodiment is shown. The method may be performed by any of the components of the system of FIG. 1A.

At operation 300, potential global control variables for a future period of time are obtained by a global control system (e.g., a global control plane). The potential global control variables may be obtained using an optimization process. The optimization process may utilize constraints, governing equations, and an objective function. The objective function may be optimized, with the control variables as quantities to be optimized.

At operation 302, first simulated performance of the distributed system is obtained using a digital twin of the distributed system and the potential global control variables. The first simulated performance may be used by configuring the digital twin based on the potential global control variables. The configured digital twin may be operated for a duration of time. During operation, various simulated quantities may be monitored using the digital twin to obtain the first simulated performance.

At operation 304, an error analysis is obtained using the first simulated performance and an actual performance of the distributed system. The error analysis may be obtained by comparing the first simulated performance and the actual performance, quantifying differences between the performance, and/or otherwise analyzing the performances. The error analysis may quantify differences between the actual and simulated operation of the digital twin.

At operation 306, a plurality of predicted performance of the distributed system are obtained using the error analysis and the potential global control variables. The plurality of predictions may be obtained by ingesting the error analysis and the potential global control variables into an inference model. The inference model may be trained model that predicts future performance and likelihood of each predicted performance occurring.

At operation 308, the predicted performances are evaluated based on criteria. The predicted performances may be evaluated by ranking the predicted performances based on likelihoods of future occurrence; and comparing a best ranked of the ranked predicted performances to the criteria to obtain a quantification reflecting desirability of the best ranked of the ranked predicted performances.

The predicted performances may be ranked using an objective optimization reasoning engine. The objective optimization reasoning engine may include a state equation that models a current state of the distributed system; an output state equation that models a future state of the distributed system; and at least one constraint on the state equation and the output state equation.

The predicted performances may be for periods of time after a period of time associated with the simulated performance. The simulated performance may be for a previous and/or current period of time where telemetry data from the distributed system is available.

The criteria may be, for example, goals for operation of the distributed system. The goals may be defined by client systems, by administrators, and/or by other entities.

At operation 310, a determination is made regarding whether the predicted performance meet the criteria. The determination may be made based on the comparison of the best ranked predicted performance to the criteria. For example, the criteria may provide a system for scoring the best ranked predicted performance with respect to goals for the system, and a minimum score threshold that, if met, indicates that the predicted performances meet the criteria.

If the predicted performances meet the criteria, then the method may proceed to operation 312. Otherwise the method may proceed to operation 314.

At operation 312, operation of the distributed system is updated using the potential global control variables to obtain an updated distributed system, and computer implemented services are provided using the updated distributed system.

The operation may be updated by, for the current control window of control windows used to manage the distributed system: (i) distributing, to local zones of the distributed system, data distribution instructions based, at least in part, on the workload performance instructions, (ii) distributing, to local zones of the distributed system, security posture instructions, (iii) distributing, to local zones of the distributed system, workload performance instructions, and/or otherwise distributing control information based on the potential global control variables. The workload performance instructions may specify works to be performed, goals for workloads to be performed, etc. The security posture instructions may specify, for example, security goals, imperative changes to control states of local control systems, etc. The data distribution instructions may specify goals and/or imperative instructions for replicating, removing, and migrating data in the local zones of the distributed system.

The method may end following operation 312.

At operation 314, it may be concluded that the potential global control variable are unsuitable, and a new set of potential control variables may be selected for evaluation. The new potential control variables may be selected, for example, using global optimization as discussed above.

Once selected, the method may return to operation 300.

Figure 3B:
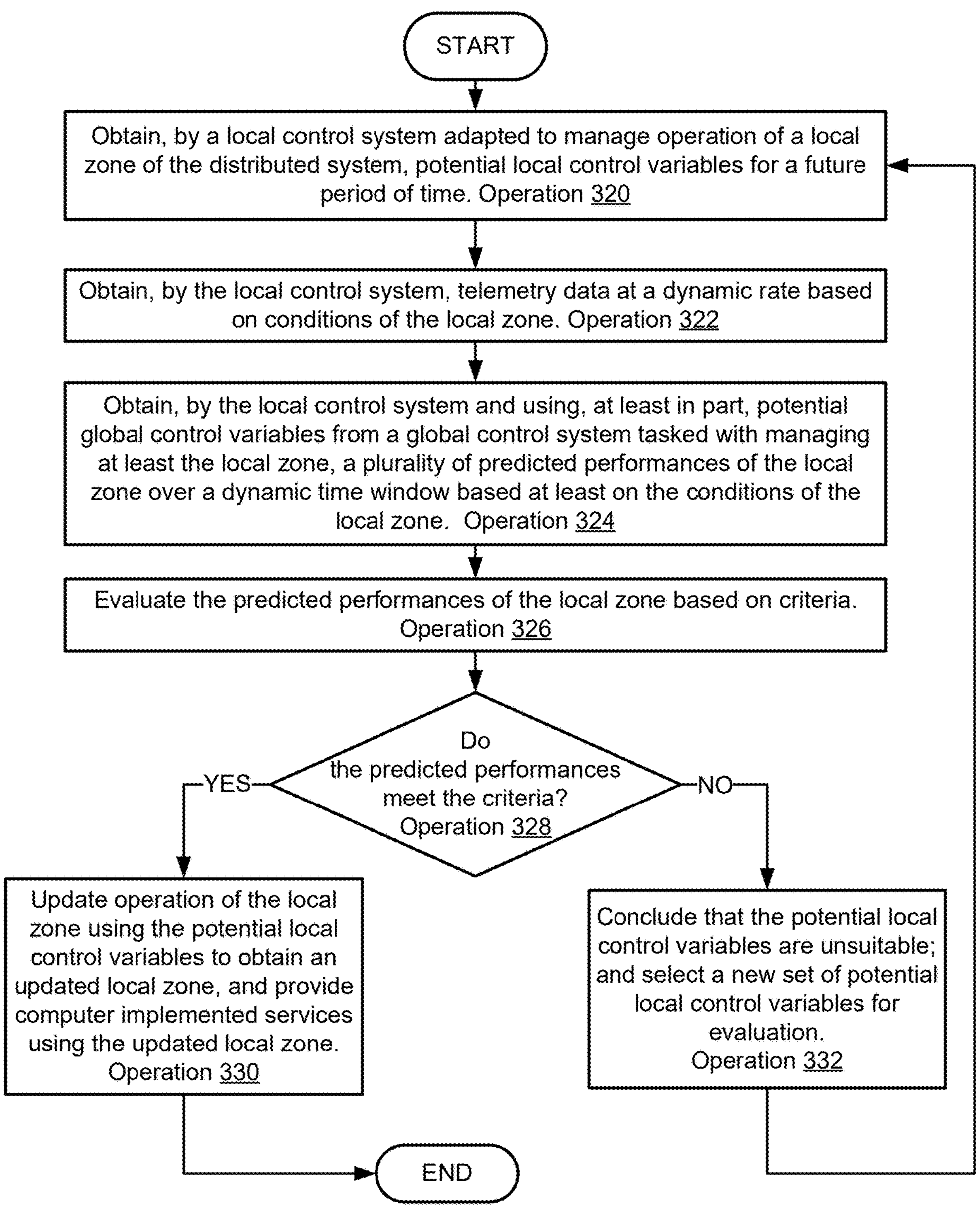

Turning to FIG. 3B, a second flow diagram illustrating a method of providing computer implemented services in accordance with an embodiment is shown. The method may be performed by any of the components of the system of FIG. 1A.

At operation 320, potential local control variables for a future period of time are obtained by a local control system (e.g., a local control plane). The potential local control variables may be obtained using an optimization process.

The optimization process may utilize constraints, governing equations, and an objective function. The objective function may be optimized, with the control variables as quantities to be optimized.

At operation 322, telemetry data for the local zone is obtained by the local control system. The telemetry data is obtained at a dynamic rate. The dynamic rate may be based on conditions of the local zone. The telemetry data may be obtained by reading it from storage, generating it, and/or receiving it from another device.

The dynamic rate may have a duration that increases with conditions of the local zone indicating that operation of the local zone is less likely to meet goals for the local zone, and may decrease with conditions of the local zone indicating that the operation of the local zone is more likely to meet goals for the local zone. For example, the dynamic rate may increase or decrease based on a formula/function that ingests various portions of telemetry data regarding condition of the local zone, and/or stability of local zone control variables used over time. The output may be a quantification that indicates the conditions of the local zone. The goals for the local zone may be defined, at least in part, by the potential global control variables.

At operation 324, a plurality of predicted performances of the local zone over a dynamic time window that is based at least on the conditions of the local zone are obtained by the local control system using, at least in part, potential global control variables from a global control system tasked with managing at least the local zone. The plurality of predictions may be obtained by ingesting, at least, the potential global control variables and the potential local control variables into an inference model. The inference model may be a trained model that predicts future performance and likelihood of each predicted performance occurring.

Prior to obtaining the predicted performances, a first simulated performance of the local zone may be obtained using a digital twin of the local and the potential local control variables. The first simulated performance may be obtained by configuring the digital twin based on the potential local control variables. The configured digital twin may be operated for a duration of time. During operation, various simulated quantities may be monitored using the digital twin to obtain the first simulated performance.

Once the first simulated performance is obtained, an error analysis may be obtained using the first simulated performance and an actual performance of the local zone. The error analysis may be obtained by comparing the first simulated performance and the actual performance, quantifying differences between the performances, and/or otherwise analyzing the performances. The error analysis may quantify differences between the actual operation of the local zone (or a portion thereof) and simulated operation of the local zone by the digital twin.

The error analysis may also be used as input to the inference model, and/or may be used to decide whether to update the digital twins and re-simulate the operation of the local zone with the digital twins. For example, a large amount of error (e.g., passing a threshold level) may indicate that the simulation is not sufficiently accurate. The digital twin may be updated by a subject matter expert and/or automated process (e.g., parameter tuning).

The dynamic time window may have a duration that is based on stability of the local control variables over time (e.g., previously completed control windows). As the stability (e.g., gradient) increases or decreases, the duration may increase or decrease accordingly. For example, the duration may decrease as stability also decreases to increase a rate of adaptation. Control window durations may similarly change dynamically.

At operation 326, the predicted performances are evaluated based on criteria. The predicted performances may be evaluated by ranking the predicted performances based on likelihoods of future occurrence; and comparing a best ranked of the ranked predicted performances to the criteria to obtain a quantification reflecting desirability of the best ranked of the ranked predicted performances.

The predicted performances may be ranked using an objective optimization reasoning engine. The objective optimization reasoning engine may include a state equation that models a current state of the distributed system; an output state equation that models a future state of the distributed system; and at least one constraint on the state equation and the output state equation.

The predicted performances may be for periods of time after a period of time associated with the simulated performance. The simulated performance may be for a previous and/or current period of time where telemetry data from the distributed system is available.

The criteria may be, for example, goals for operation of the local zone (e.g., may be indicated by the global control variables). The goals may be defined by client systems, by administrators, and/or by other entities.

At operation 328 a determination is made regarding whether the predicted performances meet the criteria. The determination may be made based on the comparison of the best ranked predicted performance to the criteria. For example, the criteria may provide a system for scoring the best ranked predicted performance with respect to goals for the system, and a minimum score threshold that, if met, indicates that the predicted performances meet the criteria.

If the predicted performances meet the criteria, then the method may proceed to operation 330. Otherwise the method may proceed to operation 332.

At operation 330, operation of the local zone is updated using the potential local control variables to obtain an updated local zone, and computer implemented services are provided using the updated local zone. The computer implemented services may be any type and quantity of such services. The updates may modify hardware/software/configurations/etc. of the local zone, may result in data migration, may result in changes to security posture, may change network policy (e.g., blacklisting address ranges), etc.

The operation may be updated by, for the current control window of control windows used to manage the distributed system: (i) distributing, to service devices of the local zone, data distribution instructions, (ii) distributing, to the service devices of the local zone, security posture instructions, (iii) distributing, to the service devices of the local zone, workload performance instructions, and/or otherwise distributing control information based on the potential local control variables. The workload performance instructions may specify works to be performed, goals for workloads to be performed, etc. The security posture instructions may specify, for example, security goals, imperative changes to control states of local control systems, etc. The data distribution instructions may specify goals and/or imperative instructions for replicating, removing, and migrating data in the local zones of the distributed system.

The method may end following operation 330.

At operation 332, it may be concluded that the potential local control variable are unsuitable, and a new set of potential local control variables may be selected for evaluation. The new potential local control variables may be selected, for example, using global optimization (and/or other types of optimization) as discussed above.

Once selected, the method may return to operation 320.

Thus, using the methods illustrated in FIGS. 3A-3B, embodiments disclosed herein may facilitate provisioning of computer implemented services in a distributed system. The services may be facilitated by managing operation of the system using digital twin simulation, prediction of future operation, and optimization for control variable selection. Accordingly, the system may be more likely to successfully provide computer implemented services over time through continuous adaptation of system management to changing conditions.

Figure 3C:
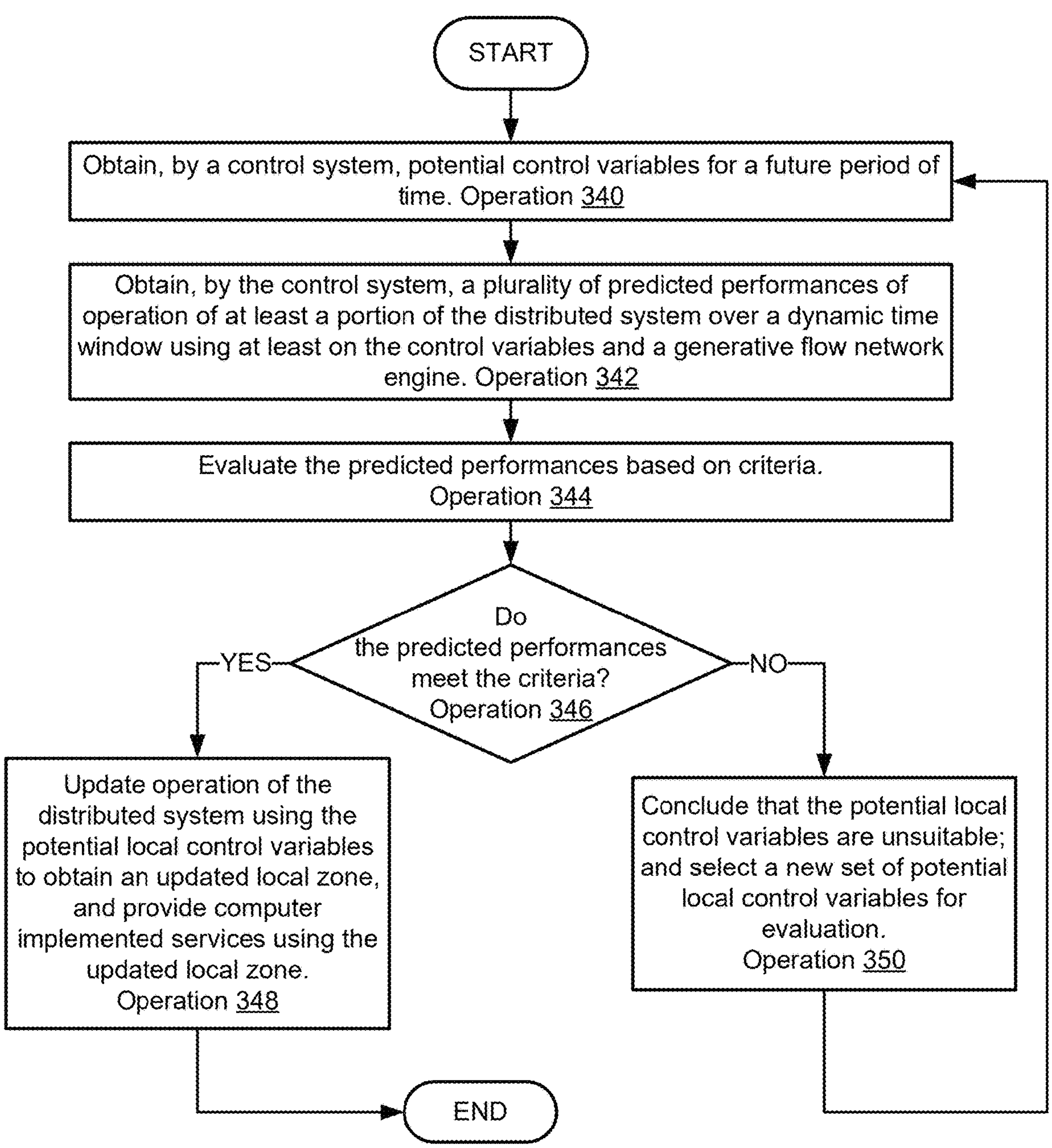

Turning to FIG. 3C, a third flow diagram illustrating a method of providing computer implemented services in accordance with an embodiment is shown. The method may be performed by any of the components of the system of FIG. 1A.

At operation 340, potential control variables for a future period of time are obtained by a control system. The potential control variables may be local and/or global. The control system may be a local and/or global control system.

At operation 342, a plurality of predicted performances of operation of at least a portion of the distributed system are obtained over a dynamic time window using at least the potential control variables and a generative flow network engine. The plurality of predicted performances may be obtained by (i) predicting potential flows of states, and (ii) simplifying the potential flows of the states.

For example, predicted potential future states of the distributed system, orderings between the predicted potential future states, and probabilities of occurrence for the predicted potential future states may be generated using a generative model of the generative flow network engine. The obtained predictions may be a graph data structure, similar to that discussed with respect to FIGS. 2D-2E.

The predicted potential future states are for time periods in time window for prediction, and the potential control variables are for a control window during which selected potential control variables will govern operation of the distributed system. The orderings may define temporal ordering.

To simplify the potential flows, meshes present in the graph data structure may be identified, a system of linear equations may be established based on the meshes, and a direct flow data structure may be obtained using the system of linear equations. In other words, the system of linear equations may be solved with the plurality of predicted performances being the solved for quantities (e.g., state relationships).

At operation 346, a determination is made regarding whether the predicted performances meet the criteria. The determination may be made based on the comparison of a best ranked predicted performance to the criteria. For example, the criteria may provide a system for scoring the best ranked predicted performance with respect to goals for the system, and a minimum score threshold that, if met, indicates that the predicted performances meet the criteria.

If the predicted performances meet the criteria, then the method may proceed to operation 348. Otherwise the method may proceed to operation 350.

At operation 348, operation of the distributed system (or a portion thereof) is updated using the potential control variables to obtain an updated distributed system, and computer implemented services are provided using the updated distributed system. The computer implemented services may be any type and quantity of such services. The updates may modify hardware/software/configurations/etc. of the distributed system, may result in data migration, may result in changes to security posture, may change network policy (e.g., blacklisting address ranges), etc.

The method may end following operation 348.

Returning to operation 346, the method may proceed to operation 350 following operation 346.

At operation 350, it may be concluded that the potential control variables are unsuitable, and a new set of potential control variables may be selected for evaluation. The new potential control variables may be selected, for example, using global optimization (and/or other types of optimization) as discussed above.

Once selected, the method may return to operation 340.

Thus, using the method shown in FIG. 3C, predicted activity of the distributed system (or portions thereof) may be obtained for various control variables. The predicted activity may then be evaluated and used to drive operation of the system.

Figure 3D:
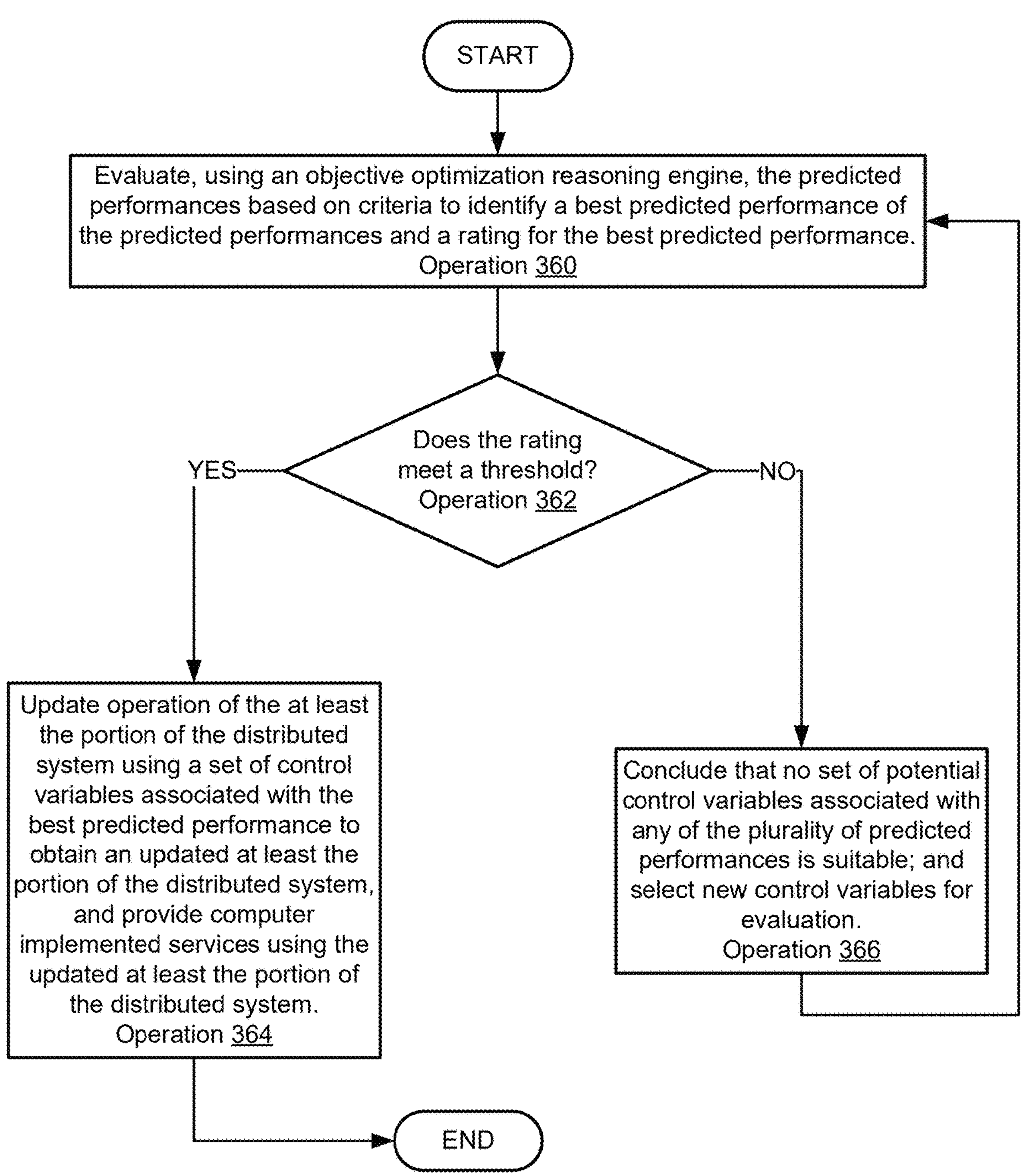

Turning to FIG. 3D, a fourth flow diagram illustrating a method of providing computer implemented services in accordance with an embodiment is shown. The method may be performed by any of the components of the system of FIG. 1A.

Prior to operation 360, operations from FIGS. 3A-3C may be performed. For example, operation 340 and 342 may be performed resulting in generation of simplified directed flows being available for evaluation. To evaluate the flows, an objective optimization reasoning engine may be used. The objective optimization reasoning engine may be similar in function to the flow illustrated in FIG. 2F.

At operation 360, the predicted performances may be evaluated based on criteria to identify a best predicted performance of the predicted performances and a rating for the best predicted performance. The predicted performances may be evaluated using the objective optimization reasoning engine. During the evaluation, an optimization process may be performed that optimizes an objective function that provides quantifications for the predicted performances.

The objective function may be of any type and form, but may evaluate over an entire prediction window (e.g., which may be longer than a control window). For example, the value ascribed to a performance may depend on the predicted performance across the span of the prediction window.

To make the evaluations, various requests may be made by the optimization process to a neuro symbolic reasoning (or other inferencing) process. The neuro symbolic reasoning process may generalize relationships present in the simplified directed flows (e.g., 268), control variables (e.g., 270), and various other information learned through previous optimization and inferencing processes (e.g., may be stored in a meta-learning knowledge repository, and may include information regarding actual operation based on previously used control variables). The neuro symbolic reasoning process may infer using the aforementioned information and provide predicted outcomes to the optimization process.

Generally, the optimization process may locally and/or globally search the input space (e.g., control variable space) for control variables that are more likely to result in desired operational outcomes for the distributed system. Thus, the output from the neuro symbolic reasoning process may be used as input to the objective function during optimization, which may be iteratively evaluated to identify a best fit set of control variables. The optimization process may also use any number of constraints to further guide the optimization process.

Once the optimization process is complete, information regarding the optimization and contextual information may be added to the meta-learning repository. For example, information regarding the predicted outcome, information regarding the identified best fit control variables, information regarding subsequent operation of the distributed system based on the best fit control variables, and/or other information may be stored for future use in learning. Thus, in subsequent optimization processes, the meta-learning process may be better able to predict outcomes (e.g., may correct for errors in the simplified directed flows, which may be only based on simulation).

At operation 362, a determination may be made regarding whether the rating meets a threshold. The determination may be made by comparing the rating to the threshold. The rating may be, for example, a value ascribed by the objective function to a set of control variables associated with the best predicted performance (e.g., best outcome from the neuro reasoning engine for the set of control variables).

If the rating meets the threshold, then the method may proceed to operation 364. Otherwise the method may proceed to operation 366.

At operation 364, operation of the at least portion of the distributed system is updated using a set of control variables associated with the best predicted performance to obtain an updated distributed system, and computer implemented services are provided using the updated distributed system. The computer implemented services may be any type and quantity of such services. The updates may modify hardware/software/configurations/etc. of the distributed system, may result in data migration, may result in changes to security posture, may change network policy (e.g., blacklisting address ranges), etc.

The method may end following operation 364.

Returning to operation 362, the method may proceed to operation 366 following operation 362.

At operation 366, it may be concluded that no set of potential control variables associated with any of the plurality of predicted performances is suitable, and a new set of potential control variables may be selected for evaluation. The new potential control variables may be selected, for example, using global optimization (and/or other types of optimization) such as continued optimization.

Once selected, the method may return to operation 360.

Thus, using the method illustrated in FIG. 3D, control variables may be identified that may be more likely to cause the distributed system to meet long term goals. For example, by evaluating over full prediction windows and using neuro symbolic reasoning to parse and make inferences used in optimization, the disclosed embodiments may be more likely to select control variables that are better able to cause operation of the distributed system to meet operational goals.

Figure 3E:
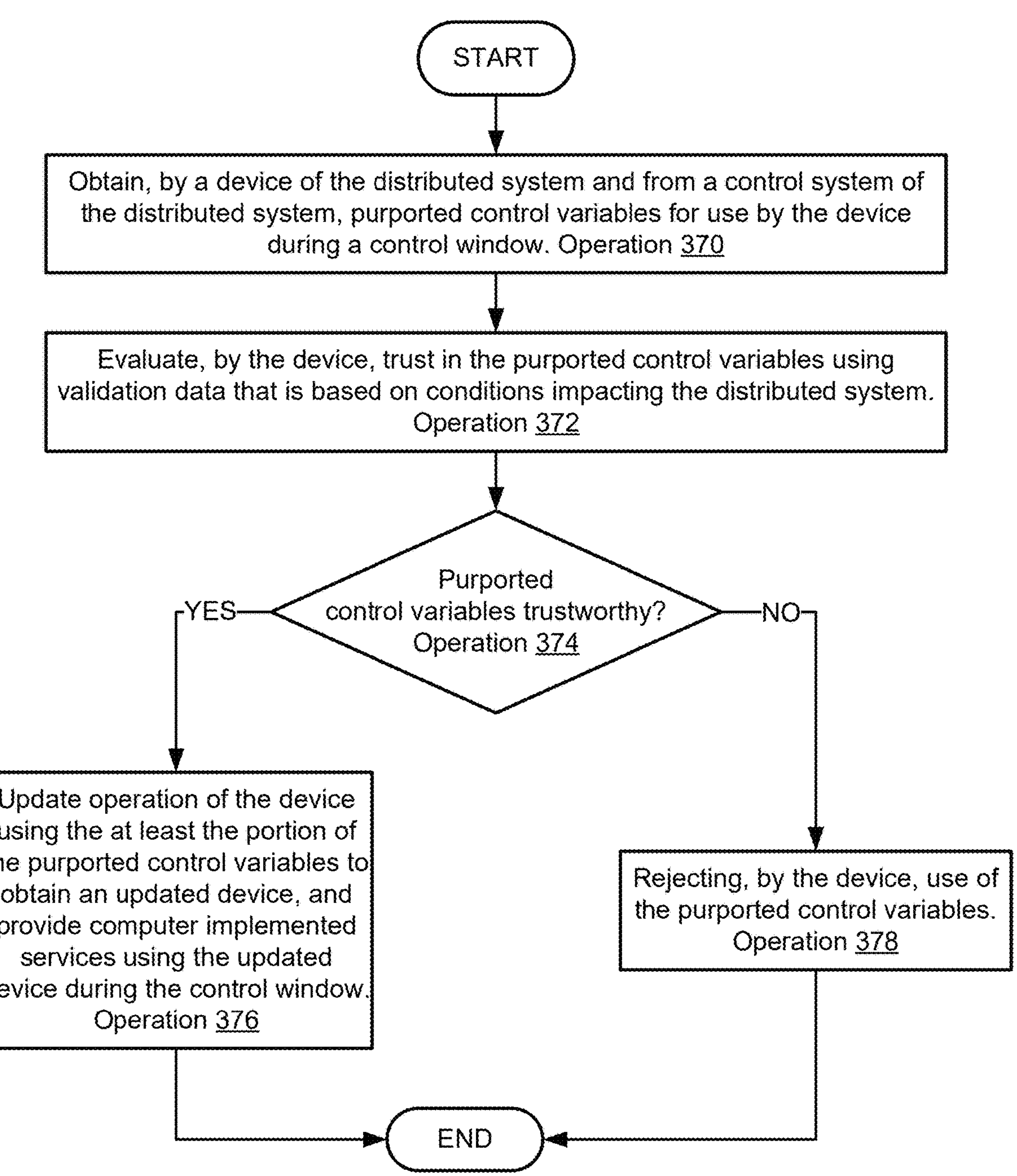

Turning to FIG. 3E, a fifth flow diagram illustrating a method of providing computer implemented services in accordance with an embodiment is shown. The method may be performed by any of the components of the system of FIG. 1A.

Prior to operation 370, control variables for a control window may be selected via any of the methods and processes shown in FIGS. 2A-3D.

At operation 370, purported control variables for use by a device during a control window are obtained by the device and from a control system of a distributed system. The purported control variables may be obtained by (i) reading them from storage, (ii) generating them, (iii) receiving them from another device, and/or via other methods.

At operation 372, trust in the purported control variables may be evaluated using validation data that is based on conditions impacting the distributed system. The validation data may be dynamic and change as the conditions impacting the distributed system change over time.

The trust may be evaluated using criteria, thresholds, and/or other validation data. The criteria may define tests and the thresholds may be conditions for the tests. If the results of the tests meet the thresholds, then the purported control variables may be deemed to be trustworthy.

The trust may be obtained by applying the criteria and thresholds to the purported control variables. The criteria may specify, for example, types and levels of verification procedures to be performed. The validation procedures may include, for example, cryptographic verification, attestations by other trusted entities, integrity verification (e.g., using integrity verification such as error correction/error identification data, and/or other types of validation procedures. The thresholds may specify the extent to which the tests must be passed for the control variables to be trusted.

It will be appreciated that different tests/thresholds may apply to different control variables. Consequently, portions of the control variables may be deemed to be trustworthy while other portions may be deemed to be untrustworthy.

At operation 374, a determination is made regarding whether any of the control variables are trustworthy. If at least one is trustworthy (or otherwise meets criteria, such as a minimum number/fraction), then the method may proceed to operation 376. Otherwise the method may proceed to operation 378.

At operation 376, operation of the device is updated using the at least the portion of the purported control variables (e.g., deemed to be trustworthy) to obtain an updated device, and computer implemented services are provided using the updated device during the control window.

The operation of the device may be updated by (i) generating instructions using the portion of the purported control variables, and (ii) performing a remediation procedure based on a second portion of the control variables deemed to be untrustworthy (e.g., to facilitate continued device operation). The remediation procedure may include generating additional instructions. The additional instructions may be generated by (i) obtaining replacement control variables for the second portion, and (ii) using the second portion as a basis for generating additional instructions (e.g., thereby completing the necessary instructions for the control window).

Once the instructions are obtained, the instructions/configuration changes/etc. may be provided to automation framework(s) that manage the operation of the device (and/or other devices of the distributes system).

Additionally, information regarding the conditions and both the portions of control variables (e.g., deemed trustworthy and untrustworthy) may be provided to the control system for use in future control variable selection. Thus, the originally obtained control variables may have been selected based, at least in part, using similar data for previously used control variables.

The method may end following operation 376.

Returning to operation 374, the method may proceed to operation 378 following operation 374 when no purported control variables are deemed trustworthy.

At operation 378, use of the purported control variables is rejected by the device. Thus, the control variables may not be used in operation of the device (e.g., at least during the control window).

The method may end following operation 378.

Thus, using the method shown in FIG. 3E, a distributed system may be less likely to be compromised through use of malicious and/or erroneous control variables.

Figure 5:
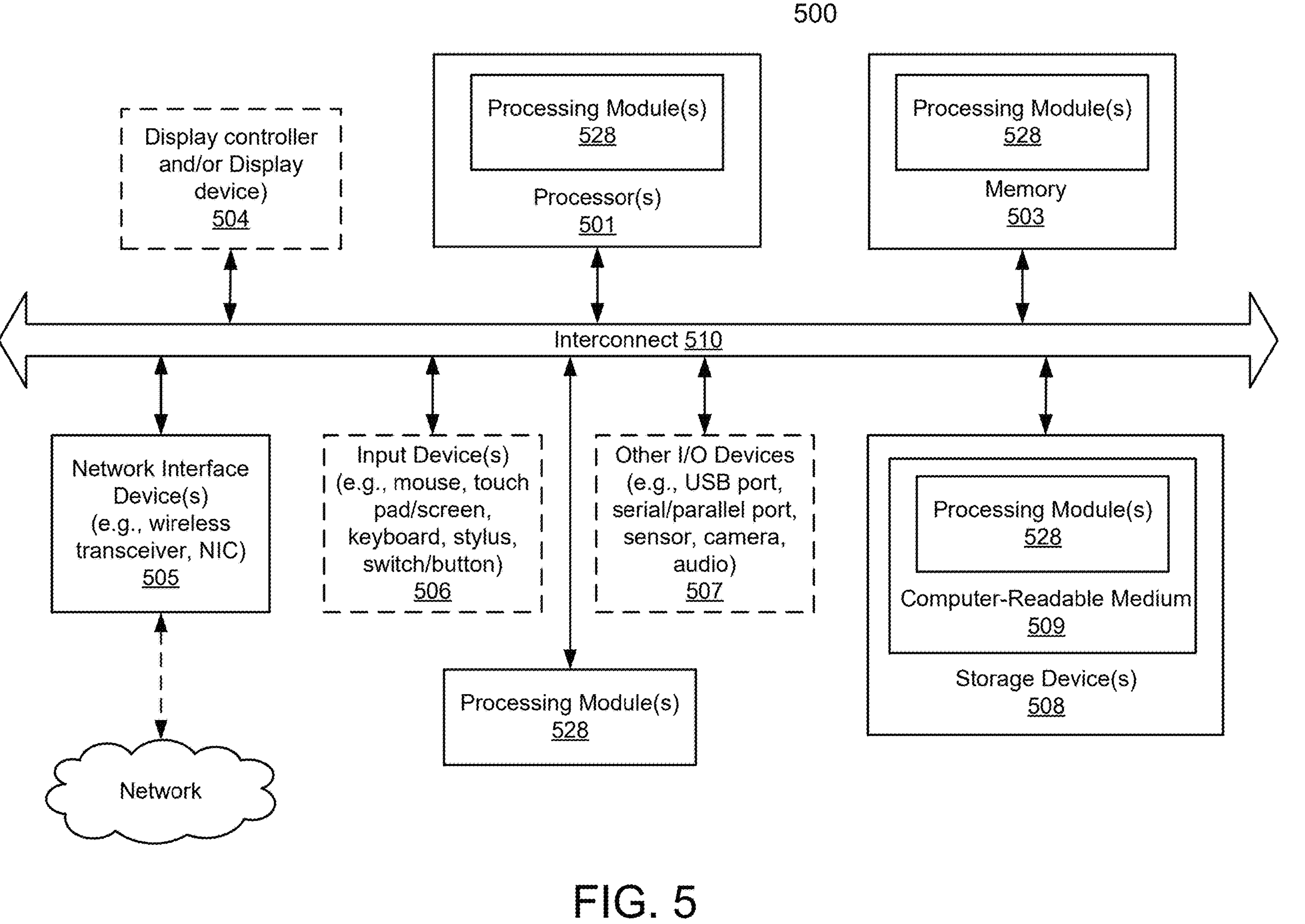
FIG. 5 shows a block diagram illustrating a data processing system in accordance with an embodiment.

Any of the components illustrated in FIGS. 1A-2F and 4A may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac Os®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories and optical and magnetic media.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory computer readable medium stores information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a distributed system, the method comprising:

obtaining, by a device of the distributed system and from a control system of the distributed system, purported control variables for use by the device during a control window;

evaluating, by the device, the purported control variables using validation criteria selected from a validation repository according to a level of likelihood of threat exposure based on conditions impacting the distributed system;

in a first instance of the evaluating where at least a first portion of the purported control variables are found to satisfy the validation criteria:

updating operation of the device using at least the first portion of the purported control variables to obtain an updated device, and providing computer implemented services using the updated device and the first portion of the purported control variables during the control window; and in a second instance of the evaluating where the purported control variables are found to not satisfy the validation criteria:

rejecting, by the device, use of the purported control variables.

2. The method of claim 1, further comprising:

in the first instance of the evaluating:

identifying a second portion of the purported control variables that are found to be not satisfy the validation criteria; and performing, based on the second portion, a remediation procedure to facilitate continued operation of the device.

3. The method of claim 2, wherein performing the remediation procedure comprises synthesizing replacement control variables for the second portion of the control variables.

4. The method of claim 2, wherein the purported control variables are based, at least in part, on feedback regarding evaluation of previous purported control variables for another control window.

5. The method of claim 4, further comprising:

in the first instance of the evaluating:

generating new feedback based on the first portion, the second portion, and the conditions impacting the distributed system; and initiating use of the new feedback in subsequently performed control variable selection processes.

6. The method of claim 5, wherein the new feedback indicates, at least, that the second portion were deemed to not satisfy the validation criteria, and a basis for failing to satisfy the validation criteria.

7. The method of claim 1, wherein the validation criteria and validation thresholds are dynamic, and changed based on the conditions impacting the distributed system.

8. The method of claim 7, wherein the conditions impacting the distributed system comprise at least one selected from a list consisting of:

available computing resources for use during a next control window;

estimated workload during the next control window;

a security posture of at least the device; and a network security risk level of a network to which the distributed system is exposed.

9. The method of claim 7, wherein the validation criteria is based, at least in part, on cryptographic validation methods usable to validate authenticity and integrity of the purported control variables.

10. The method of claim 1, further comprising:

obtaining, by the control system and using a digital twin predictive control engine, the purported control variables.

11. A non-transitory computer readable storage medium having instructions stored therein, which when executed by a processor, cause operations for managing a distributed system to be performed, the operations comprising:

obtaining, by a device of the distributed system and from a control system of the distributed system, purported control variables for use by the device during a control window;

evaluating, by the device, the purported control variables using validation criteria selected from a validation repository according to a level of likelihood of threat exposure based on conditions impacting the distributed system;

in a first instance of the evaluating where at least a first portion of the purported control variables are found to satisfy the validation criteria:

updating operation of the device using at least the first portion of the purported control variables to obtain an updated device, and providing computer implemented services using the updated device and the first portion of the purported control variables during the control window; and in a second instance of the evaluating where the purported control variables are found to not satisfy the validation criteria:

rejecting, by the device, use of the purported control variables.

12. The non-transitory computer readable storage medium of claim 11, wherein the operations further comprise:

in the first instance of the evaluating:

identifying a second portion of the purported control variables that are found to not satisfy the validation criteria; and performing, based on the second portion, a remediation procedure to facilitate continued operation of the device.

13. The non-transitory computer readable storage medium of claim 12, wherein performing the remediation procedure comprises synthesizing replacement control variables for the second portion of the control variables.

14. The non-transitory computer readable storage medium of claim 12, wherein the purported control variables are based, at least in part, on feedback regarding evaluation of previous purported control variables for another control window.

15. The non-transitory computer readable storage medium of claim 14, wherein the operations further comprise:

in the first instance of the evaluating:

generating new feedback based on the first portion, the second portion, and the conditions impacting the distributed system; and initiating use of the new feedback in subsequently performed control variable selection processes.

16. A data processing system, comprising:

a processor; and a memory coupled to the processor to store instructions, which when executed by the processor, cause operations for managing a distributed system to be performed, the operations comprising:

obtaining, by a device of the distributed system and from a control system of the distributed system, purported control variables for use by the device during a control window;

evaluating, by the device, the purported control variables using validation criteria selected from a validation repository according to a level of likelihood of threat exposure based on conditions impacting the distributed system;

in a first instance of the evaluating where at least a first portion of the purported control variables are found to satisfy the validation criteria:

updating operation of the device using at least the first portion of the purported control variables to obtain an updated device, and providing computer implemented services using the updated device and the first portion of the purported control variables during the control window; and in a second instance of the evaluating where the purported control variables are found to not satisfy the validation criteria:

rejecting, by the device, use of the purported control variables.

17. The data processing system of claim 16, wherein the operations further comprise:

in the first instance of the evaluating:

identifying a second portion of the purported control variables that are found to not satisfy the validation criteria; and performing, based on the second portion, a remediation procedure to facilitate continued operation of the device.

18. The data processing system of claim 17, wherein performing the remediation procedure comprises synthesizing replacement control variables for the second portion of the control variables.

19. The data processing system of claim 17, wherein the purported control variables are based, at least in part, on feedback regarding evaluation of previous purported control variables for another control window.

20. The data processing system of claim 19, wherein the operations further comprise:

in the first instance of the evaluating:

generating new feedback based on the first portion, the second portion, and the conditions impacting the distributed system; and initiating use of the new feedback in subsequently performed control variable selection processes.

* * * * *